(12) United States Patent
Yamashita

(10) Patent No.: US 8,335,097 B2
(45) Date of Patent: Dec. 18, 2012

(54) SEMICONDUCTOR DEVICE THAT CONVERTS INPUT DIRECT CURRENT VOLTAGE TO REGULATED OUTPUT VOLTAGE BY INTERMITTENTLY SWITCHING ON AND OFF THE INPUT DIRECT CURRENT VOLTAGE

(75) Inventor: Tetsuji Yamashita, Kyoto (JP)

(73) Assignee: Panasonic Corporation, Osaka (JP)

( * ) Notice: Subject to any disclaimer, the term of this patent is extended or adjusted under 35 U.S.C. 154(b) by 211 days.

(21) Appl. No.: 12/816,686

(22) Filed: Jun. 16, 2010

(65) Prior Publication Data

US 2010/0321963 A1 Dec. 23, 2010

(30) Foreign Application Priority Data

Jun. 19, 2009 (JP) ................... 2009-146728

(51) Int. Cl.
*H02M 7/44* (2006.01)
*H02M 3/335* (2006.01)
(52) U.S. Cl. ...................... 363/97; 363/21.13
(58) Field of Classification Search .............. 323/282, 323/283, 284, 285, 222; 363/15, 16, 18, 363/19, 97, 21.01, 21.12, 21.15, 21.16, 21.13
See application file for complete search history.

(56) References Cited

U.S. PATENT DOCUMENTS

| | | | |
|---|---|---|---|
| 6,738,266 B2 | 5/2004 | Hosotani et al. | |
| 7,492,619 B2 * | 2/2009 | Ye et al. ............ | 363/97 |
| 2008/0084723 A1 | 4/2008 | Balakrishnan et al. | |
| 2008/0130324 A1 | 6/2008 | Choi et al. | |
| 2009/0073733 A1 | 3/2009 | Balakrishnan et al. | |

FOREIGN PATENT DOCUMENTS

| | | |
|---|---|---|
| JP | 09-056152 | 2/1997 |
| JP | 2005-168084 | 6/2005 |
| JP | 2006-050760 | 2/2006 |
| JP | 4039362 | 11/2007 |
| JP | 2008-092793 | 4/2008 |
| JP | 2009-077565 | 4/2009 |

* cited by examiner

*Primary Examiner* — Gary L Laxton
*Assistant Examiner* — Zekre Tsehaye
(74) *Attorney, Agent, or Firm* — Greenblum & Bernstein, P.L.C.

(57) ABSTRACT

A semiconductor device providing a control circuit for controlling a switching power supply apparatus includes: an intermittent-oscillation control circuit which outputs an enable signal providing instructions to execute and suspend switching alternately; a turn-on control circuit which changes between an execution state and a suspension state of the switching according to the enable signal, and outputs, only in the execution state, a turn-on signal which turns on the switching element with a switching period; and an intermittent-oscillation frequency control circuit which causes the turn-on control circuit to delay the changing between the execution state and the suspension state so that an intermittence period including periods during which the turn-on control circuit is in the execution state and the turn-on control circuit is in the suspension state falls outside of a specific time range. Intermittent oscillation is thus operated out of a specific frequency band within an audible frequency range.

8 Claims, 17 Drawing Sheets

SEMICONDUCTOR DEVICE THAT CONVERTS INPUT DIRECT CURRENT VOLTAGE TO REGULATED OUTPUT VOLTAGE BY INTERMITTENTLY SWITCHING ON AND OFF THE INPUT DIRECT CURRENT VOLTAGE

BACKGROUND OF THE INVENTION (1) Field of the Invention

The present invention relates to a switching power supply apparatus and a semiconductor device each of which regulates output voltages against input voltages by implementing switching using a switching element.

(2) Description of the Related Art

Switching power supply apparatuses have been widely used as power supply units of appliances for common household use, such as home electrical products, for purposes such as improvement of power efficiency by reducing power consumption. A switching power supply apparatus includes a semiconductor device which regulates (stabilizes) output voltages through switching operation using semiconductors (switching elements such as transistors).

Particularly, in recent years, there is a strong demand for switching power supply apparatuses which consume less power in a standby state, because reduction of power consumption of equipment such as home electric appliances in the standby state is attracting attention from the viewpoint of prevention of global warming.

Generally, in a low-load state such as a standby load, energy loss in switching power supply units is dominantly caused by switching loss due to switching operation. One of well known techniques for improving power efficiency under a light load such as a standby load is operating a power supply under intermittent-oscillation control.

FIG. 1 shows an exemplary configuration of a switching power supply device 900 including a semiconductor device with a conventional intermittent-oscillation control circuit. Operation during intermittent oscillation will be briefly described below with reference to a timing chart shown in FIG. 2. It is assumed that current-mode PWM control is performed during normal operation at, for example, a switching frequency of 100 kHz.

In the switching power supply device 900 configured as shown in FIG. 1, an output voltage $V_{out}$ increases as an output current $I_{out}$ decreases from a current in a rated-load state when the switching power supply device 900 is in a changing-load state shown in FIG. 2. An output voltage detection circuit 5 provides an FB terminal with a feedback signal which indicates the magnitude of the output voltage $V_{out}$ (for example, an outflow current $I_{FB}$ which increases as the output voltage $V_{out}$ increases). Based on the current $I_{FB}$, the feedback control circuit 11 outputs a control voltage $V_{EAO}$ which indicates a smaller limiting value on a current flowing through a switching element 2 for a greater output voltage $V_{out}$.

When under a lighter load, an intermittent-oscillation control circuit 16 operates to provide a turn-on control circuit 18 with an enable signal which instructs to perform intermittent control of switching operation, so that intermittent-oscillation control starts under which switching operation of the switching element 2 is repeatedly executed and suspended as in a first standby state shown in FIG. 2.

When an output load current is smaller than in the first standby state, the switching operation changes to a second standby state in which the switching operation has a longer suspension period than in the first standby state. In other words, the lower the load is, the longer an intermittence control period, which includes an execution period and a suspension period of the switching operation of the switching element 2, is controlled to be. Such a control of intermittent oscillation performed under a light load improves power efficiency under the light load.

In such operation, even when the switching element 2 executes switching at a frequency of 100 kHz during normal operation, the frequency under intermittence control in an intermittent-oscillation control state which includes the execution period and the suspension period of the switching decreases to within an audible frequency range of 20 kHz or lower. This may cause a transformer or a capacitor, which is generally used in the switching power supply device, to generate audio noises.

In other words, intermittent-oscillation control under a light load is effective in improving power efficiency under the light load but has disadvantage of causing elements such as a transformer to generate noises when a frequency under intermittence control falls within an audible frequency range.

Well-known techniques for reducing such noises of the transformer include decreasing of a peak current of a switching element during intermittent oscillation, and bonding or impregnating of the transformers. However, decreasing of a peak current of a switching element during intermittent oscillation increases the number of switching cycles during the intermittent oscillation, resulting in worse power efficiency. The technique used with the transformer results in an increase in cost. Thus, reducing audible noises of a transformer while improving power efficiency under a light load may require much time and cost.

Patent reference 1 (Japanese Patent No. 4039362) discloses a conventional switching power supply device to address to such need for reduction of noises of a transformer under intermittent-oscillation control when under such a light load.

According to Patent Reference 1, a soft-start capacitor for start-up is repeatedly charged and discharged in order to perform intermittent oscillation, and a switching element is controlled so that it executes switching when an error-detecting signal being outputted instructs to change from a suspension state to an execution state of oscillation under intermittent-oscillation control, and so that it suspends switching when the error-detecting signal being outputted instructs to change from an execution state to a suspension state of oscillation under the intermittent-oscillation control in the case where the voltage across the capacitor is at a high level during the charge and the discharge are performed. In other words, the maximum frequency under intermittent-oscillation control is determined according to a frequency of cycles of charge and discharge of the soft-start capacitor for start-up.

With this control, a minimum intermittence period during intermittent oscillation is determined, and noises of the transformer are reduced.

Patent Reference 2 (Japanese Unexamined Patent Application Publication No. 2008-92793) discloses a switching power supply device which reduces noises of a transformer under intermittent-oscillation control when under a light load.

According to Patent Reference 2, a maximum intermittent control frequency during intermittent oscillation is determined by a switching frequency of a switching element and the number of switching cycles while oscillation is executed in the intermittent oscillation.

In one specific example, a switching frequency during normal operation is set to 30 kHz and there are at least four switching cycles while switching is executed in intermittent oscillation. The maximum intermittent control frequency is determined by the number of switching cycles included in an intermittence period, five switching cycles in this case: four consecutive switching cycles and one switching cycle suspended while switching is executed during intermittent oscillation. Thus, the maximum intermittent control frequency is 6 kHz. The maximum intermittent control frequency is thus determined, and noises of the transformer under intermittent-oscillation control are reduced.

In the switching power supply apparatuses disclosed in Patent Reference 1 and Patent Reference 2, noises of transformers under intermittent-oscillation control are reduced by determining a minimum intermittence period in intermittent oscillation, in other words, determining a maximum intermittent control frequency in intermittent oscillation.

For the conventional switching power supply apparatus disclosed in Patent Reference 1, however, it is difficult to optimize both soft-starting time and a maximum intermittent control frequency for reducing noises of transformers during intermittent oscillation because the intermittent oscillation frequency is determined using the soft-start capacitor for start-up. For example, if the soft-start capacitor with a large capacitance is provided in order to prolong the soft-start time, the suspension period during the intermittent oscillation is prolonged, thus increasing output ripple during intermittent-oscillation control.

For the conventional switching power supply apparatus disclosed in Patent Reference 2, a minimum period for intermittence control is determined by controlling the number of switching cycles within a switching execution period during intermittent oscillation based on a switching frequency of the switching element. In other words, a maximum intermittent control frequency is a frequency obtained by dividing the switching frequency. This configuration necessitates a device, such as a counter which counts the number of switching cycles or pulses of a clock signal having a fixed frequency so as to specify the minimum period for intermittence control. Furthermore, a degree of freedom in specifying a maximum frequency for intermittence control is small because a maximum intermittent control frequency is determined by dividing the frequency of the clock signal.

It is to be noted that Patent Reference 1 and Patent Reference 2 each disclose a technique for controlling only a maximum intermittent control frequency during intermittent oscillation.

The present invention, conceived to address the problems with the conventional techniques, has an object of providing a switching power supply apparatus and a semiconductor device each of which is controlled so as to avoid intermittent oscillation at a specific frequency band within an audible frequency range without using a control method such as a PWM control, a PFM control, or a quasi-resonant control, for the purpose of effectively reducing noises which components such as a transformer and a ceramic capacitor used in a switching power supply that performs intermittent-oscillation control under a light load, generates by operating at an audible frequency band.

SUMMARY OF THE INVENTION

In order to solve the problems, the semiconductor device according to the present invention, which controls a switching power supply that converts an input direct current voltage to a regulated output direct current voltage by intermittently switching on and off the input direct current voltage using a switching element, includes: an intermittent-oscillation control circuit which outputs an enable signal providing an instruction to execute the switching and an instruction to suspend the switching alternately; a turn-on control circuit which changes between an execution state and a suspension state of the switching according to the instructions of the enable signal, and outputs a turn-on signal which turns on the switching element with a switching period; and an intermittent-oscillation frequency control circuit which causes the turn-on control circuit to delay the changing between the execution state and the suspension state of the switching so that an intermittence period falls outside of a specific time range, the intermittence period including a period during which the turn-on control circuit is in the execution state and a period during which the turn-on control circuit is in the suspension state.

Furthermore, the intermittent-oscillation frequency control circuit may include: a first timer which measures a first period from a time point when the turn-on control circuit is in one of the execution state and the suspension state of the switching; and a second timer which measures a second period from the time point, the second period being longer than the first period, and, the intermittent-oscillation frequency control circuit may delay the changing of the turn-on control circuit to the one of the execution state and the suspension state of the switching until an end of the second period in the case where the enable signal provides one of the instruction to execute the switching and the instruction to suspend the switching after an end of the first period and before the end of the second period.

Furthermore, the turn-on control circuit may generate a clock signal having a frequency of the switching and output the clock signal as the turn-on signal only while in the execution state of the switching, the intermittent-oscillation frequency control circuit, in the case where the first timer and the second timer has measured the first period and the second period, respectively, since the time point when the turn-on control circuit is in one of the execution state and the suspension state of the switching, output a reset signal as soon as the enable signal provides the one of the instruction to execute the switching and the instruction to suspend the switching before the end of the first period or after the end of the second period, and output a reset signal after the end of the second period when the enable signal provides the one of the instruction to execute the switching and the instruction to suspend the switching after the end of the first period and before the end of the second period, the turn-on control circuit changes to the one of the execution state and the suspension state of the switching in accordance with the reset signal, and the first timer and the second timer may start measuring the first period and the second period again, respectively, in a cycle of the clock signal, the cycle coming first after the output of the reset signal.

Furthermore, the turn-on control circuit may include: a latch circuit which outputs a state signal that indicates whether the turn-on control circuit is in the execution state or the suspension state of the switching when the latch circuit is set or reset, the setting being performed when the enable signal provides the other one of the instruction to execute the switching and the instruction to suspend the switching, and the resetting being performed when the latch circuit is provided with the reset signal; and a logic gate which outputs the clock signal as the turn-on signal when the state signal indicates that the turn-on control circuit is in the execution state of the switching, and which masks the clock signal when the state signal indicates that the turn-on control circuit is in the suspension state of the switching.

Furthermore, the first timer and the second timer may have a first constant current source and a first capacitor and set the first period to be measured depending on a current of the first constant current source and a capacitance of the first capacitor, and the second timer may have a second constant current source and a second capacitor and set the second period to be measured depending on a current of the second constant current source and a capacitance of the second capacitor.

Furthermore, the semiconductor device may be provided with at least one of a first external terminal and a second external terminal, the first external terminal being used for setting the first period to be measured by the first timer, and the second period being used for setting the second period to be measured by the second timer.

Furthermore, the semiconductor device a first capacitor may be connected between the first external terminal and a ground, and a second capacitor may be connected between the second external terminal and the ground, the first capacitor being used for setting the first period, and the second capacitor being used for setting the second period.

Furthermore, the semiconductor device may include the switching element, and whole circuitry including the switching element may be formed on a single semiconductor substrate.

Furthermore, the present invention may be implemented as a switching power supply apparatus including: the semiconductor device, a transformer which transforms, into an output alternating current voltage, an input alternating current voltage generated by switching on and off the input direct current voltage using the switching element; and a smoothing circuit which converts the output alternating current voltage into the output direct current voltage.

The semiconductor device according to the present invention is a semiconductor device which controls a switching power supply that converts an input direct current voltage into a regulated output direct current voltage by intermittently switching on and off the input direct current voltage using a switching element, allowing an intermittent control frequency to fall outside a specific frequency band using an intermittent-oscillation frequency control circuit which delays changing between an execution state and a suspension state of the switching so that an intermittence period, which includes a period during which the turn-on control circuit is in the execution state and a period during which the turn-on control circuit is in the suspension state falls outside of a specific time range.

With this, the intermittent oscillation is operated out of the specific frequency band, so that audio noises within a specific audible frequency range are effectively reduced in comparison with the conventional techniques with which only a maximum intermittent control frequency is set.

Furthermore, with the configuration in which the first timer and the second timer are provided so as to delay the later one of two consecutive changes of switching from the execution state to the suspension state or from the execution state to the suspension state so that such consecutive changes does not occur within the time range from the first period to the second period, a specific frequency band excluded from the intermittent control frequencies may be set regardless of the soft-start capacitor or the clock signal to be used by which the switching frequency is determined.

This makes the semiconductor device according to the present invention widely applicable to control methods such as a PWM control with which a clock signal has a fixed frequency, a PFM control with which frequency is variable, and a quasi-resonant control with which a switching element turns on when a source-drain voltage of a switching element is a minimum.

Furthermore, with the configuration in which the semiconductor device is provided with the external terminal which allows setting of periods to be measured by the first timer and the second timer, a specific time range within which the intermittence period does not fall may be set from the outside of the semiconductor device as necessary.

This has an advantageous effect of reducing audio noises of switching power supply apparatuses which have various specifications and generate audio noises at different frequency bands, by using semiconductor devices having a common configuration.

Thus, the present invention has an advantageous effect of easily reducing noises which are generated by transformers or capacitors and are a problem in intermittent oscillation necessary for improvement in power efficiency under a light load, by using a simple configuration.

Further Information about Technical Background to this Application

The disclosure of Japanese Patent Application No. 2009-146728 filed on Jun. 19, 2009 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

A semiconductor device and a switching power supply apparatus will be described below with reference to drawings in order to describe embodiments of the present invention.

(Embodiment 1)

A switching power supply apparatus according to Embodiment 1 of the present invention will now be described.

Figure 1:
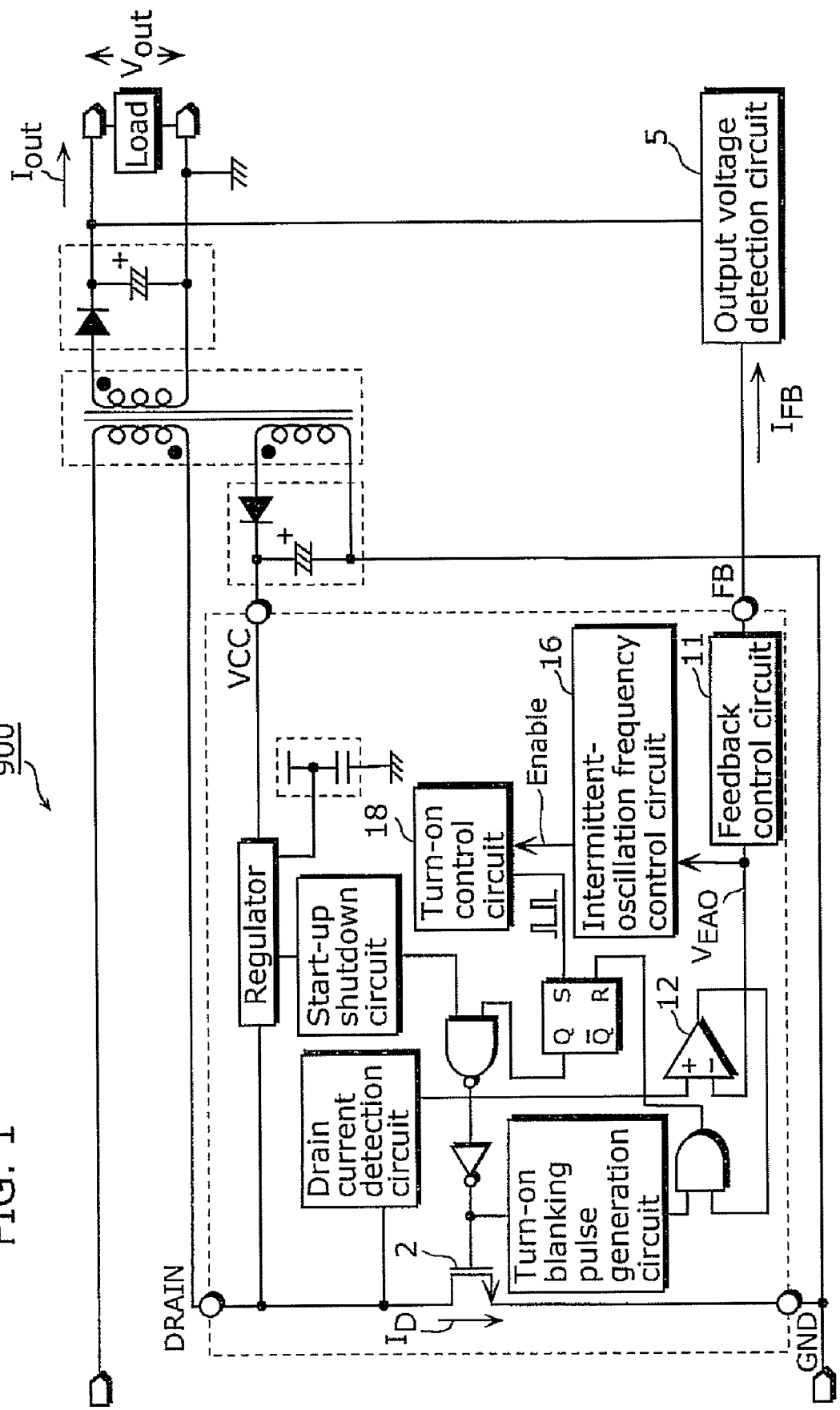
FIG. 1 is a circuit diagram which shows an exemplary configuration of a switching power supply apparatus including a semiconductor device with a conventional intermittent-oscillation control circuit.
Figure 2:
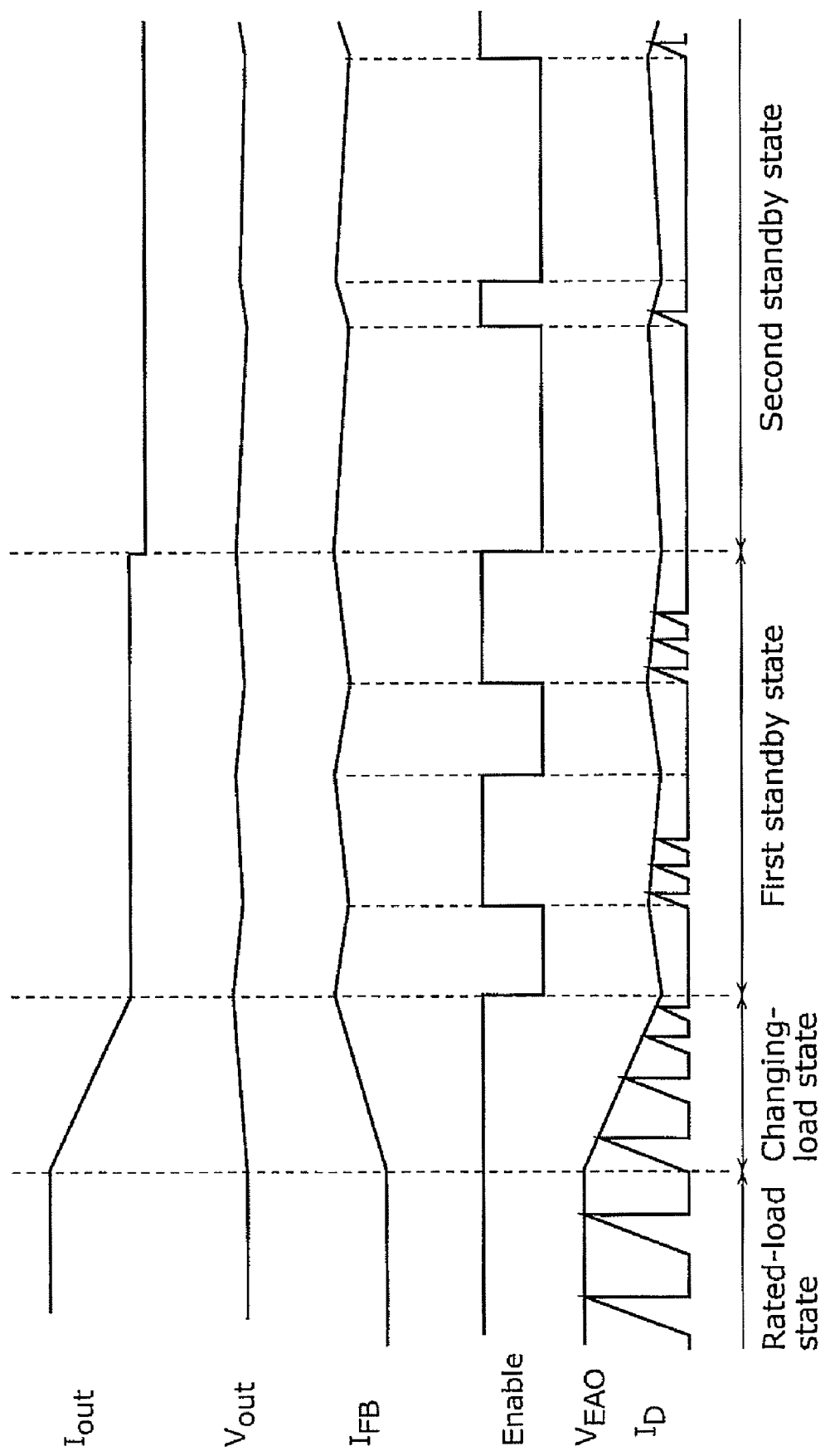
FIG. 2 is a timing chart illustrating intermittent oscillation of a switching element in the switching power supply apparatus including the semiconductor device with the conventional intermittent-oscillation control circuit.
Figure 3:
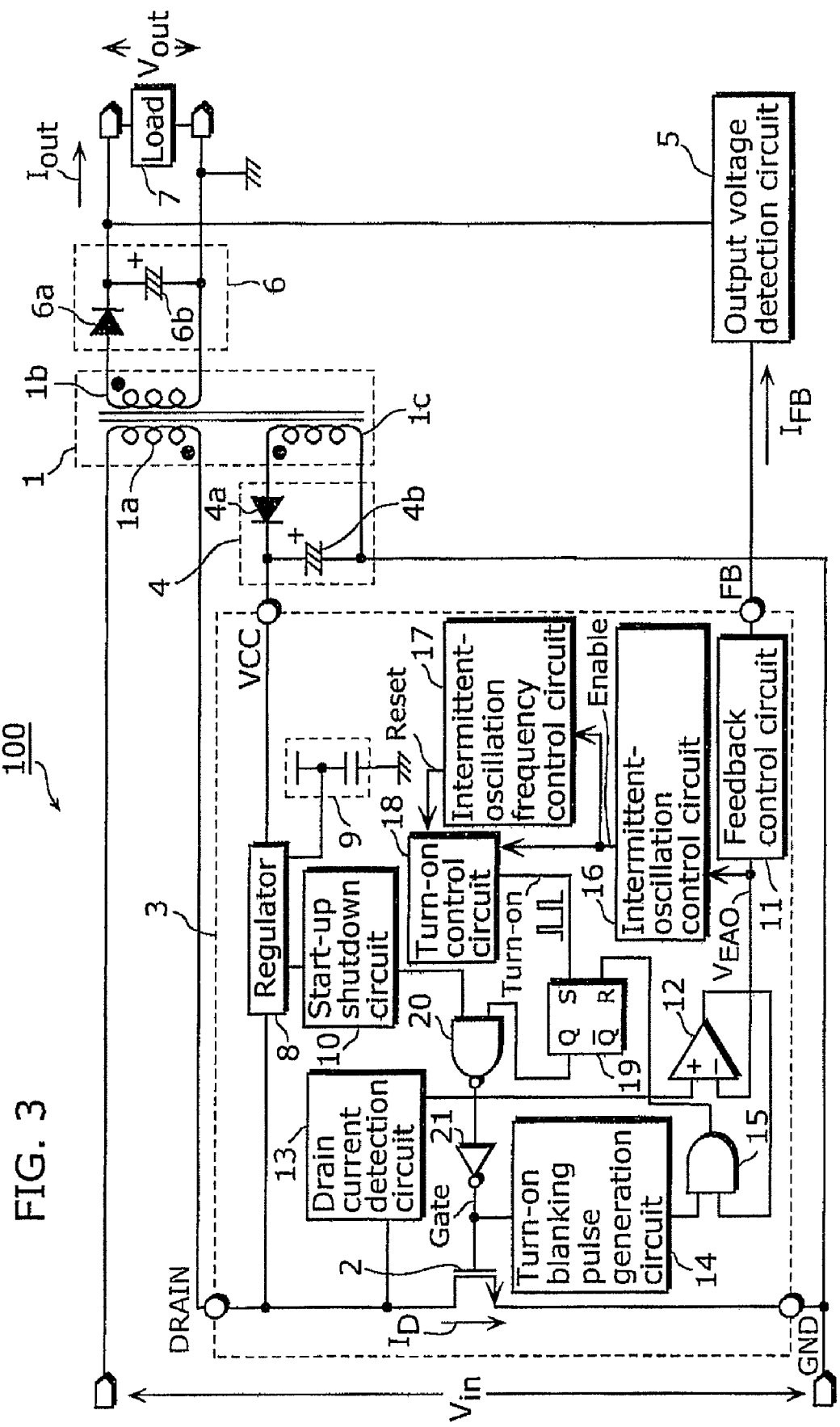
FIG. 3 is a circuit diagram which shows an exemplary configuration of a switching power supply apparatus including a semiconductor device according to Embodiment 1.

FIG. 3 is a circuit diagram which shows an exemplary configuration of a switching power supply apparatus 100 including a semiconductor device according to Embodiment 1. The semiconductor device functions as a control circuit 3 of the switching power supply apparatus 100.

Referring to FIG. 3, a transformer 1 has a primary winding 1a, a secondary winding 1b, and an auxiliary winding 1c. The primary winding 1a and the secondary winding 1b are opposite in polarity. An alternating current voltage obtained from the secondary winding 1b is converted into an output direct current voltage by an output voltage generation unit 6, and then supplied to a load 7 The output voltage generation unit 6 includes a rectifying diode 6a and a capacitor 6b. The switching power supply apparatus 100 is a flyback switching power supply apparatus.

A switching element 2 is connected to the primary winding 1a. Switching on and off of the switching element 2 is controlled according to a gate signal provided from the gate driver 21 to a gate of the switching element 2 which is a control electrode of the switching element 2.

The switching element 2 is included in a control circuit 3. The switching element 2 is a switching element such as a power MOSFET, and may be integrated on a single semiconductor substrate together with other part of the control circuit 3. The semiconductor device which functions as the control circuit 3 has four external input-output terminals: a DRAIN terminal, a GND terminal, a VCC terminal, and an FB terminal.

The DRAIN terminal is a junction point between the switching element 2 and the primary winding is of the transformer 1, that is, a terminal connected to a drain of the switching element 2.

The GND terminal, which is a terminal to connect a source of the switching element 2 and GND of the control circuit 3 to a ground level, is connected to a low-voltage side terminal of two terminals to which input voltages $V_{in}$ are applied.

The VCC terminal connects an output of the rectifying and smoothing circuit 4, which includes a rectifying diode 4a and a capacitor 4b, and a regulator 8, which is incorporated in the control circuit 3. Alternating current voltage generated in the auxiliary winding is by switching operation of the switching element 2 is rectified and smoothed, and then provided to the control circuit 3 through the VCC terminal.

The FB terminal is a terminal which provides a feedback control circuit 11 of the control circuit 3 with a feedback signal (for example, a current generated by a phototransistor) outputted from the output voltage detection circuit 5.

The regulator 8 is connected among the DRAIN terminal of the switching element 2, the VCC terminal, a start-up shutdown circuit 10, and an internal circuit voltage source 9 of the control circuit3. When the input voltage Vin is applied to the DRAIN terminal of the switching element 2 through the transformer 1, the regulator 8 passes a current from the DRAIN terminal to the capacitor 4b of the rectifying and smoothing circuit 4, which outputs the auxiliary power supply voltage VCC, through the VCC terminal to increase the auxiliary power supply voltage VCC When the voltage at the VCC terminal reaches a start-up voltage, the current supply from the DRAIN terminal to the VCC terminal is cut, and then the capacitor 4b of the rectifying and smoothing circuit 4 which outputs the auxiliary power supply voltage VCC supplies current to internal circuitry of the control circuit 3. When the voltage at the VCC terminal decreases to a shutdown voltage, the current supply from the DRAIN terminal to the VCC terminal is started again as before the starting, so that the voltage at the VCC terminal increases again. The regulator 8 regulates voltage of the internal circuit voltage source 9 so that the voltage remains constant.

The start-up shutdown circuit 10 monitors the voltage at the VCC terminal and controls start and stop of oscillation of the switching element 2 depending on the magnitude of the VCC terminal voltage. When the voltage at the VCC terminal reaches the start-up voltage, the start-up shutdown circuit 10 provides a high-level signal to one of inputs of a NAND circuit 20, and a low-level signal when the VCC terminal voltage decreases to the shutdown voltage.

The feedback control circuit 11 determines a limit level of the current flowing through the switching element 2 according to the feedback signal provided from the output voltage detection circuit 5 to the FB terminal of the control circuit 3 (for example, a current $I_{FB}$ flowing out of the FB terminal into the output voltage detection circuit 5) in order to maintain an output voltage $V_{out}$ at a constant level. The feedback control circuit 11 then provides a control voltage $V_{EAO}$, which indicates the determined limit level, to a minus input of the comparator 12.

The control voltage $V_{EAO}$ provided from the feedback control circuit 11 is controlled so that the current flowing through the switching element 2 decreases when the output voltage $V_{out}$ increases under a light load and so that the current flowing through the switching element 2 increases when the output voltage $V_{out}$ decreases under a heavy load.

Figure 4:
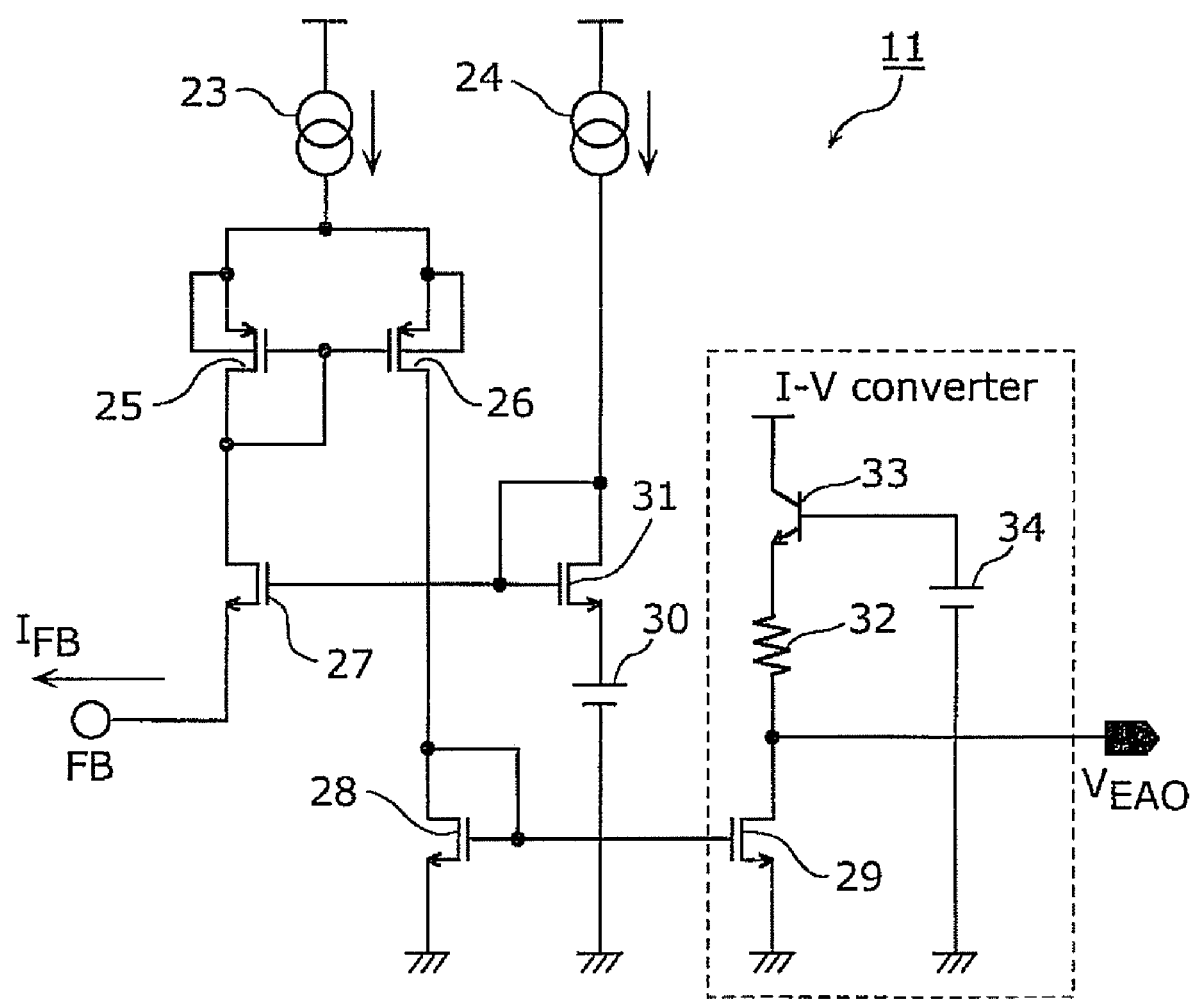
FIG. 4 is a circuit diagram which shows an exemplary configuration of a feedback control circuit included in the semiconductor device according to Embodiment 1.

FIG. 4 is a circuit diagram which shows an exemplary, specific circuit configuration of the feedback control circuit 11.

The feedback control circuit 11 includes constant current sources 23 and 24, p-type MOSFETs 25 and 26, n-type MOSFET 27, 28, 29, and 31, constant voltage sources 30 and 34, a resistor 32, and an NPN bipolar transistor 33.

The n-type MOSFET 29, the resistor 32, and the NPN bipolar transistor 33 forms an I-V converter. A pair of the p-type MOSFETs 25 and 26 and a pair of the n-type MOSFETs 28 and 29 each form a pair of current-mirror circuits.

The constant current sources 23 and 24 are provided in order to limit a current in the case where the FB terminal is shorted to the GND. The current $I_{FB}$ flowing out of the FB terminal is converted into the control voltage $V_{EAO}$ by the I-V converter. The $V_{EAO}$ is determined depending on a current flowing through the resistor 32 and varies according to EQ. 1.

$$V_{EAO}=V_{R0}-V_{be}-R_0 \times I_0 \qquad \text{(EQ. 1)},$$

wherein $V_{EAO}$: Control voltage (output voltage of the I-V converter), $V_{R0}$: Constant voltage of the constant voltage source 34

$V_{be}$: Voltage between a base and an emitter of the NPN bipolar transistor, $R_0$: Resistance of the resistor 32, and $I_0$: Current flowing through the resistor 32.

EQ. 1 shows that the control voltage $V_{EAO}$ decreases as the current $I_0$ flowing through the resistor 32 increases. In other words, the $V_{EAO}$ decreases with an increase in the current $I_{FB}$ flowing out of the FB terminal, and the current flowing through the switching element 2 correspondingly decreases. The $V_{EAO}$ increases with a decrease in the current $I_{FB}$ flowing out of the FB terminal, and the current flowing through the switching element 2 correspondingly increases.

The current flowing through the switching element 2 is thus controlled based on the feedback signal provided from the output voltage detection circuit 5, that is, based on the current $I_{FB}$ flowing out of the FB terminal.

Figure 5:
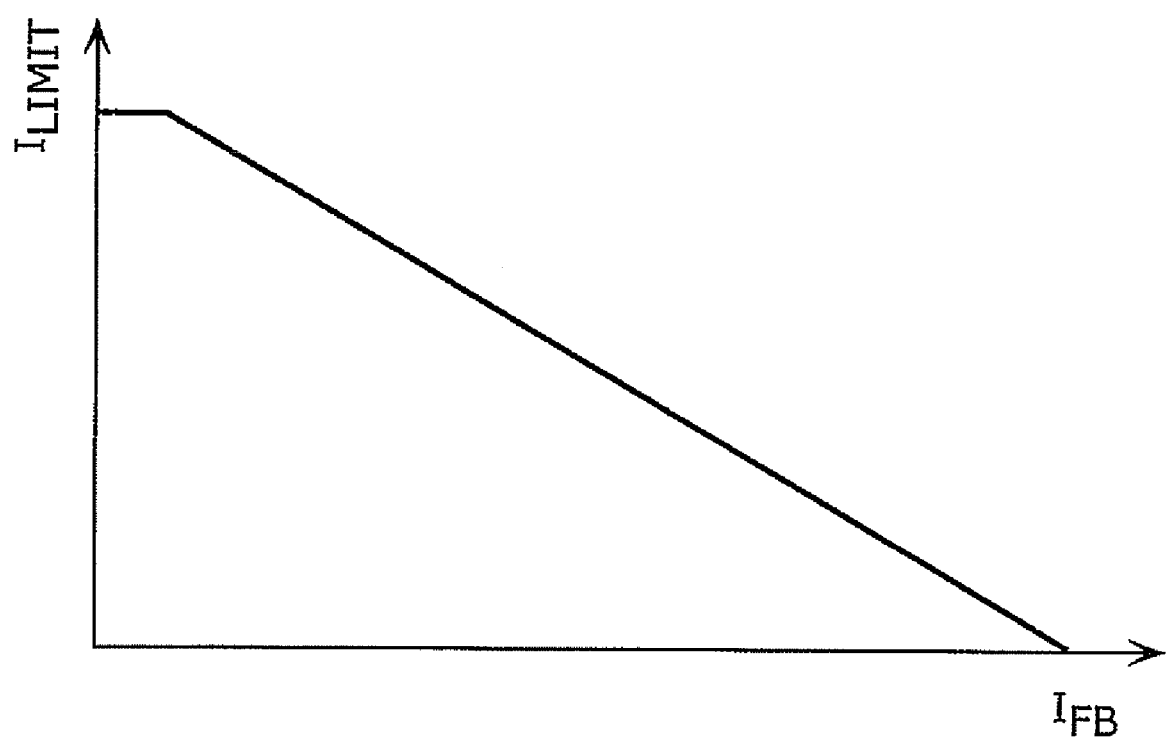
FIG. 5 is a schematic view which illustrates a current flowing through the switching element against the feedback current in the switching power supply apparatus including the semiconductor device according to Embodiment 1.

FIG. 5 is a graph which shows a relationship between the current flowing through the resistor 32, that is, the current $I_{FB}$ and a limit level of the drain current flowing in the switching element 2, $I_{LIMIT}$.

A drain current detection circuit 13, which is a current detection circuit of the switching element 2, detects the drain current flowing in the switching element 2 relatively by detecting, for example, an on-voltage which is determined by a product of the drain current flowing through the switching element 2 and an on-resistance of the switching element 2. Then, the drain current detection circuit 13 provides a voltage signal which is in proportion to the drain current to a plus input of the comparator 12. The comparator 12 provides a high-level signal to a first one of inputs of an AND circuit 15 when the output signal provided from the drain current detection circuit 13 is equal to the control voltage $V_{EAO}$ of the feedback control circuit 11.

An turn-on blanking pulse generation circuit 14 provides a low-level blanking signal to a second one of the inputs of the AND circuit 15 for a certain blanking time after the gate driver 21 provides the Gate signal to turn on the switching element 2, thereby preventing the switching element 2 from erroneous turn-off which is caused by false detection of, for example, a capacitive current spike due to the capacitance of the switching element 2. After the blanking is released, the turn-on blanking pulse generation circuit 14 provides a blanking signal at a high level to the second one of the inputs of the AND circuit 15.

When a blanking time set by the turn-on blanking pulse generation circuit 14 has elapsed from the last turning-on of the switching element 2, and a current at the limit level $I_{LIMIT}$ determined by the feedback control circuit 11 flows through the switching element 2, both of the input signals into the AND circuit 15 are at a high level, so that the output signal from the AND circuit 15 is at a high level.

Figure 6:
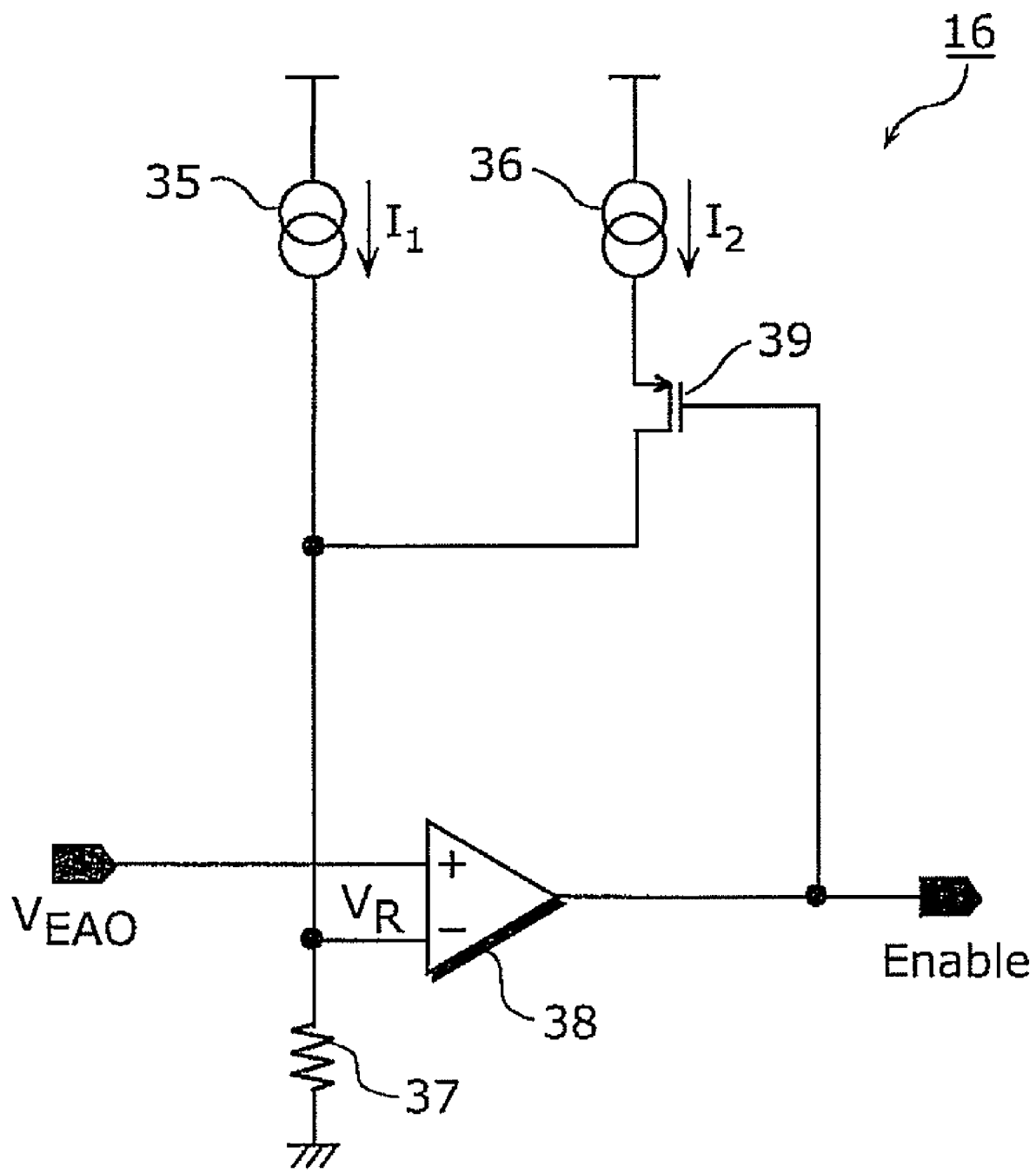
FIG. 6 is a circuit diagram which shows an exemplary configuration of an intermittent-oscillation control circuit included in the semiconductor device according to Embodiment 1.

FIG. 6 is a circuit diagram which shows an exemplary, specific circuit configuration of the intermittent-oscillation control circuit 16.

The intermittent-oscillation control circuit 16 includes constant current sources 35 and 36, a resistor 37, a comparator 38, and a p-type MOSFET 39. The constant current sources 35 and 36 output constant currents $I_1$ and $I_2$, respectively. The resistor 37 has a resistance of R.

The intermittent-oscillation control circuit 16 compares the control voltage $V_{EAO}$ provided from the feedback control circuit 11 with a reference voltage $V_R$ of the comparator 38, and then outputs an enable signal which indicates a result of the comparison. The reference voltage $V_R$ of the comparator has hysteresis described below. When $V_{EAO} > V_R$, the enable signal is at a high level and the p-type MOSFET 39 is thus in an off state. Therefore, the reference voltage $V_R$ is, $$V_R = R \times I_1 \qquad \text{(EQ. 2)}.$$

When $V_{EAO} < V_R$, the enable signal is at a low level and the p-type MOSFET 39 is thus in an on state. Therefore, the reference voltage $V_R$ is $$V_R = R \times (I_1 + I_2) \qquad \text{(EQ. 3)}.$$

The intermittent-oscillation control circuit 16 outputs the enable signal according to the above hysteresis: when $V_{EAO}$ is high, that is, an output load is high, the enable signal at the high level to instruct to execute switching; and when $V_{EAO}$ is low, that is, an output load is low, the enable signal at the low level to instruct to suspend switching.

The description will be continued with reference to FIG. 3 again.

The enable signal outputted from the intermittent-oscillation control circuit 16 is provided to an intermittent-oscillation frequency control circuit 17 and a turn-on control circuit 18. The intermittent-oscillation frequency control circuit 17 and the turn-on control circuit 18 are controlled based on the enable signal so that the turn-on control circuit 18 changes between a suspension state, in which the switching element 2 does not execute switching, and an execution state, in which the switching element 2 executes switching.

The intermittent-oscillation frequency control circuit 17 receives the enable signal provided by the intermittent-oscillation control circuit 16, and then provides a reset signal to the turn-on control circuit 18.

A turn-on signal is provided from the turn-on control circuit 18 to a set input S of an RS flip-flop 19. The turn-on signal raises an output Q of the RS flip-flop 19 to a high level, and the high-level signal is provided to a first one of the inputs of the NAND circuit 20.

Examples of specific circuit configurations of the turn-on control circuit 18 and the intermittent-oscillation frequency control circuit 17 will be described later in a description of operation of the switching power supply apparatus 100.

When the switching power supply apparatus 100 is fully started, the start-up shutdown circuit 10 provides a high-level signal to a second one of the inputs of the NAND circuit 20.

As the turn-on control circuit 18 provides the turn-on signal which is a high-level pulse signal to the set input S of the RS flip-flop 19, the RS flip-flop 19 outputs an output Q at a high level, and the first one of the inputs of the NAND circuit 20 also receives a high-level signal.

At this time, the output signal of the NAND circuit 20 is at a low level, so that the output signal of the gate driver 21 is high, turning on the switching element 2.

After the switching element 2 is turned on, and when the feedback control circuit 11 provides the switching element 2 with a current depending on the feedback signal provided from the output voltage detection circuit 5 after a turn-on blanking time, the AND circuit 15 provides a high-level signal to a reset input R of the RS flip-flop 19.

The output Q of the RS flip-flop 19 is thereby forced low, so that the first one of the inputs of the NAND circuit 20 goes low. This makes the output signal of the gate driver 21 low, so that the switching element 2 is turned off.

This is signal processing which causes switching operation of the switching element 2.

The output voltage generation unit 6 including the rectifying diode 6a and the capacitor 6b is connected to the secondary winding 1b of the transformer 1. The output voltage generation unit 6 generates the output voltage $V_{out}$ by rectifying and smoothing an alternating current voltage induced in the secondary winding 1b by switching operation of the switching element 2. The generated output voltage $V_{out}$ is supplied to the load 7.

The output voltage detection circuit 5, which includes, for example, an LED and a zener diode, detects a voltage level of the output voltage $V_{out}$ and outputs a feedback signal necessary for control circuit 3 to control the switching element 2 so that the output voltage $V_{out}$ can be stable at a predetermined voltage.

Here, it is assumed that, in the switching power supply apparatus 100, the primary winding 1a of the transformer 1 for power conversion is provided with the input voltage $V_{in}$ which is prepared from commercial alternating current power through rectification by a rectifier such as a diode bridge and smoothing by an input capacitor.

The control circuit 3 and the switching power supply apparatus 100 shown in FIG. 3 are configured as described above. Operation of them will be described below.

The alternating current power sourced from the commercial power supply is rectified by the rectifier such as a diode bridge and smoothed by the input capacitor, and then converted into the input voltage $V_{in}$. The input voltage $V_{in}$ is applied to the DRAIN terminal through the primary winding 1a of the transformer 1. As a result, a starting charge current flows from the DRAIN terminal, through the regulator 8 of the control circuit 3, to the capacitor 4b connected to the VCC terminal. Control of the switching operation of the switching element 2 is started when the voltage at the VCC terminal of the control circuit 3 increased by the charge current reaches the start-up voltage set in the start-up shutdown circuit 10.

During the starting, a starting pulse, which is not shown in FIG.

3, is generated based on the output signal outputted from the start-up shutdown circuit 10, and then the switching element 2 is turned on. At this time, the feedback signal is not provided from the output voltage detection circuit 5 to the feedback control circuit 11 because the output voltage $V_{out}$ of the secondary winding is low during the starting. Thus, the control voltage $V_{EAO}$ of the I-V converter in the feedback control circuit 11 and the voltage of the minus input of the comparator 12 are set to high.

Once the switching element 2 is turned on, a current flows through the switching element 2, and a voltage depending on the magnitude of the current flowing through the switching element 2 is provided into the plus input of the comparator 12. When the blanking time set by the turn-on blanking pulse generation circuit 14 has elapsed, the AND circuit 15 receives high level signals through both of the two inputs at the time when the input signal output signal outputted from the drain current detection circuit 13 increases to be higher than the voltage applied to the minus input of the comparator 12. The AND circuit 15 then provides a high signal to the reset input R of the RS flip-flop 19, thereby turning off the switching element 2.

After the turning off of the switching element 2, the turn-on control circuit 18 provides the turn-on signal to the set input S of the RS flip-flop 19, so that the switching element 2 is turned on again.

The output voltage $V_{out}$ is increased by repeating the switching operation as described above. When the output voltage $V_{out}$ reaches the voltage set in the output voltage detection circuit 5 or higher, the output voltage detection circuit 5 causes the current $I_{FB}$, which is the feedback signal, to flow out of the FB terminal of the control circuit 3. The control voltage $V_{EAO}$ generated by the I-V converter in the feedback control circuit 11 decreases depending on the magnitude of the current $I_{FB}$, so that the voltage at the minus input of the comparator 12 decreases. As a result, the current flowing through the switching element 2 decreases.

This is how the state of on-duty of the switching element 2 becomes appropriate. In other words, the switching element 2 is turned on by the turn-on signal provided from the turn-on control circuit 18, and turned off when the level of the current flowing through the switching element 2 reaches a current level determined by an amount of the current flowing out of the FB terminal.

This means that the current flows through the switching element 2 for a shorter time when under a light load with a small current supply to the load 7, and for a longer time when under a heavy load.

The control circuit 3 thus controls the current flowing through the switching element 2 to change on-duty in response to the power supplied to the load 7 of the switching power supply apparatus.

When under a light load with a small current supply to the load 7, the control voltage $V_{EAO}$ provided by the I-V converter in the feedback control circuit 11 decreases to be lower than the reference voltage $V_R$ of the comparator 38 included in the intermittent-oscillation control circuit 16. At this time, the enable signal outputted from the intermittent-oscillation control circuit 16 transitions from a high level, at which the enable signal instructs to execute the switching, to a low level, at which the enable signal instructs to suspend the switching.

The following is a description of a detailed configuration of the intermittent-oscillation frequency control circuit 17.

Figure 7:
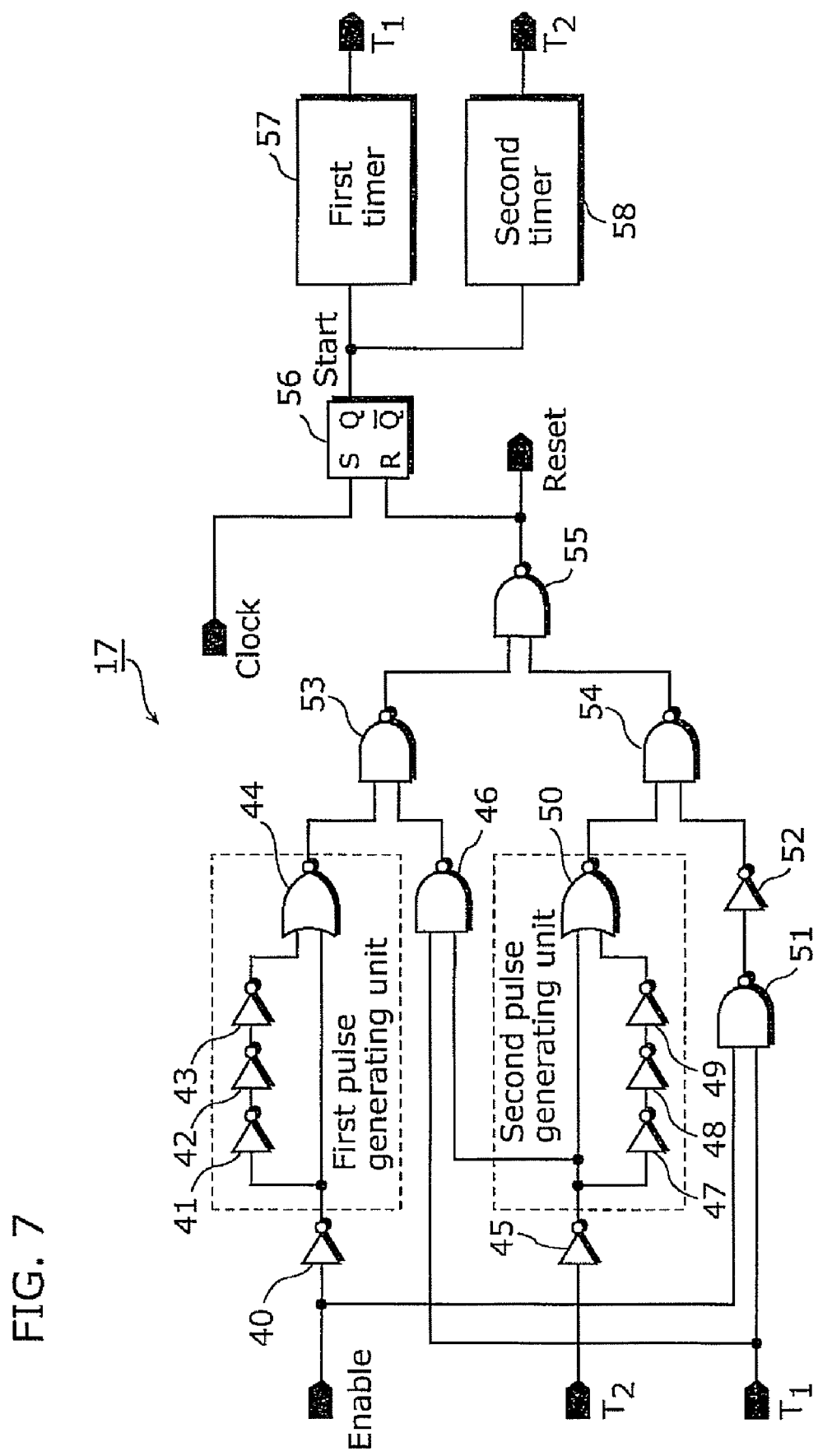
FIG. 7 is a circuit diagram which shows an exemplary configuration of an intermittent-oscillation frequency control circuit included in the semiconductor device according to Embodiment 1.

FIG. 7 is a circuit diagram which shows an exemplary circuit configuration of the intermittent-oscillation frequency control circuit 17.

A clock signal is provided from the turn-on control circuit 18 to a set input S of the RS flip-flop 56. When receiving the clock signal provided to the set input S, the RS flip-flop 56 outputs a start signal from an output Q. The start signal is provided to a first timer 57 and a second timer 58, which then output an output signal $T_1$ and an output signal $T_2$, respectively. The output signals $T_1$ and $T_2$ transition from low to high when a first period $t_1$ and a second period $t_2$ have elapsed from receiving of the start signal, respectively. The second period $t_2$ is longer than the first period $t_1$.

The enable signal is provided from the intermittent-oscillation control circuit 16 to an inverter circuit 40 and a NAND circuit 51. A NAND circuit 53 receives an output signal from a first pulse generating unit. The first pulse generating unit, which includes inverter circuits 41 to 43 and a NOR circuit 44, receives an output from the inverter circuit 40 and outputs a high level pulse signal at a rising edge of the enable signal.

The output signal $T_1$ of the first timer 57 is provided to a NAND circuit 46 and the NAND circuit 51.

The output signal $T_2$ of the second timer 58 is provided to the NAND circuit 46 through the inverter circuit 45 and to a NAND circuit 54 through a second pulse generating unit which includes inverter circuits 47 to 49 and a NOR circuit 50 and outputs a high-level pulse signal at a rising edge of the signal $T_2$.

An output signal of the NAND circuit 46 is provided to the NAND circuit 53. An output signal of the NAND circuit 51 is provided through an inverter circuit 52 to the NAND circuit 54. Output signals of the NAND circuits 53 and 54 are provided to a NAND circuit 55. The NAND circuit 55 provides a reset signal to a reset input R of the RS flip-flop 56 and to the turn-on control circuit 18.

The following is a detailed description of a configuration of the turn-on control circuit 18.

Figure 8:
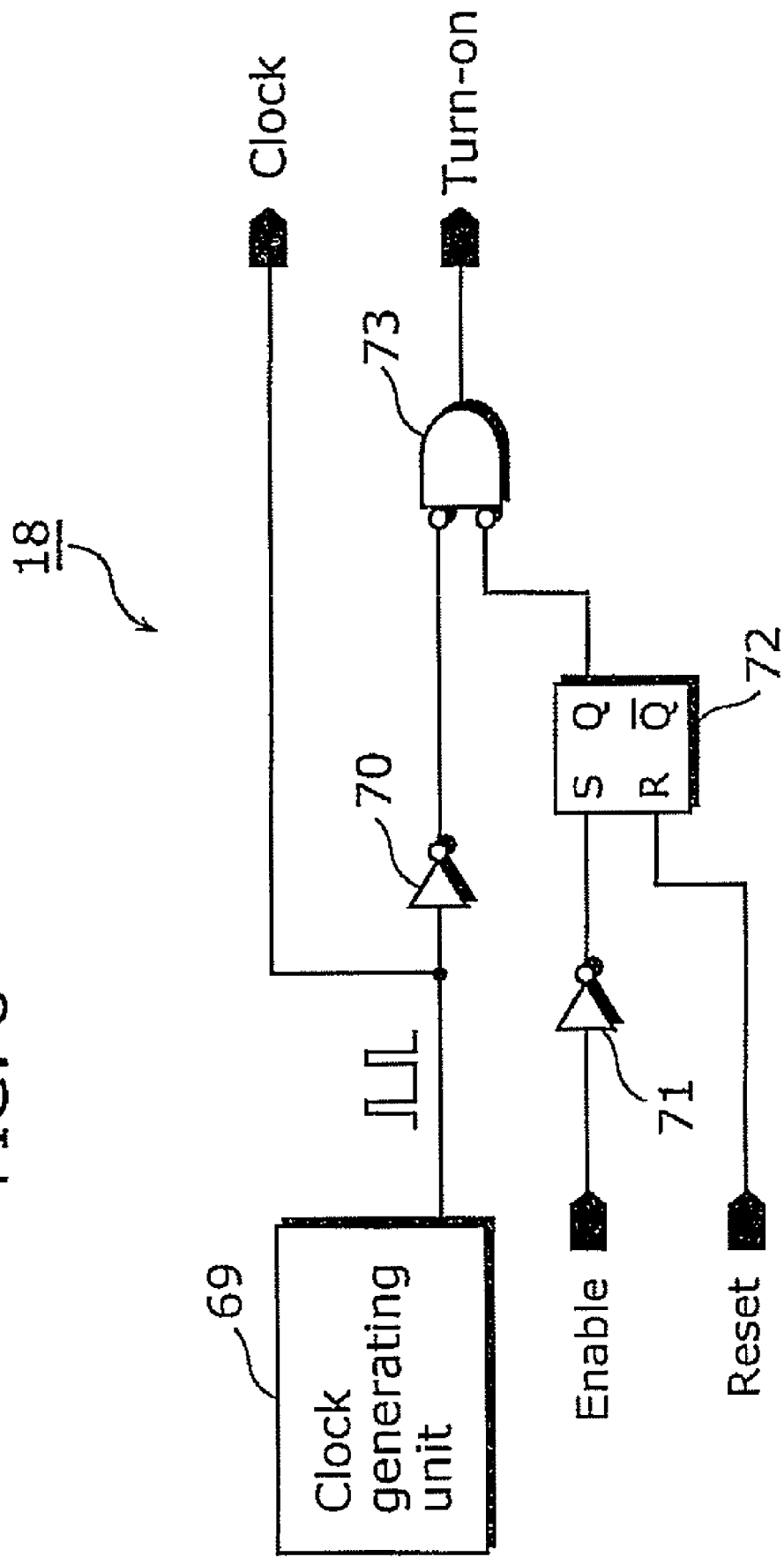
FIG. 8 is a circuit diagram which shows an exemplary configuration of a turn-on control circuit included in the semiconductor device according to Embodiment 1.

FIG. 8 is a circuit diagram which shows an exemplary configuration of the turn-on control circuit 18.

The turn-on control circuit 18 is provided with a clock generating unit 69. The clock generating unit 69 outputs the clock signal which triggers the turn-on signal. The clock signal may have a fixed frequency or a variable frequency, or may be a pulse having random periods. The clock signal is provided through an inverter circuit 70 to a first one of inputs of a NOR circuit 73.

A set input S of an RS flip-flop 72 receives the enable signal from the intermittent-oscillation control circuit 16 through an inverter circuit 71. A reset input R of the RS flip-flop 72 receives the reset signal from the intermittent-oscillation frequency control circuit 17.

An output Q of the RS flip-flop 72 is provided to a second one of the inputs of the NOR circuit 73. An output of the NOR circuit 73 is provided to the set input S of the RS flip-flop 19 shown in FIG. 3 as the turn-on signal, so that the switching element 2 is turned on.

Figure 9:
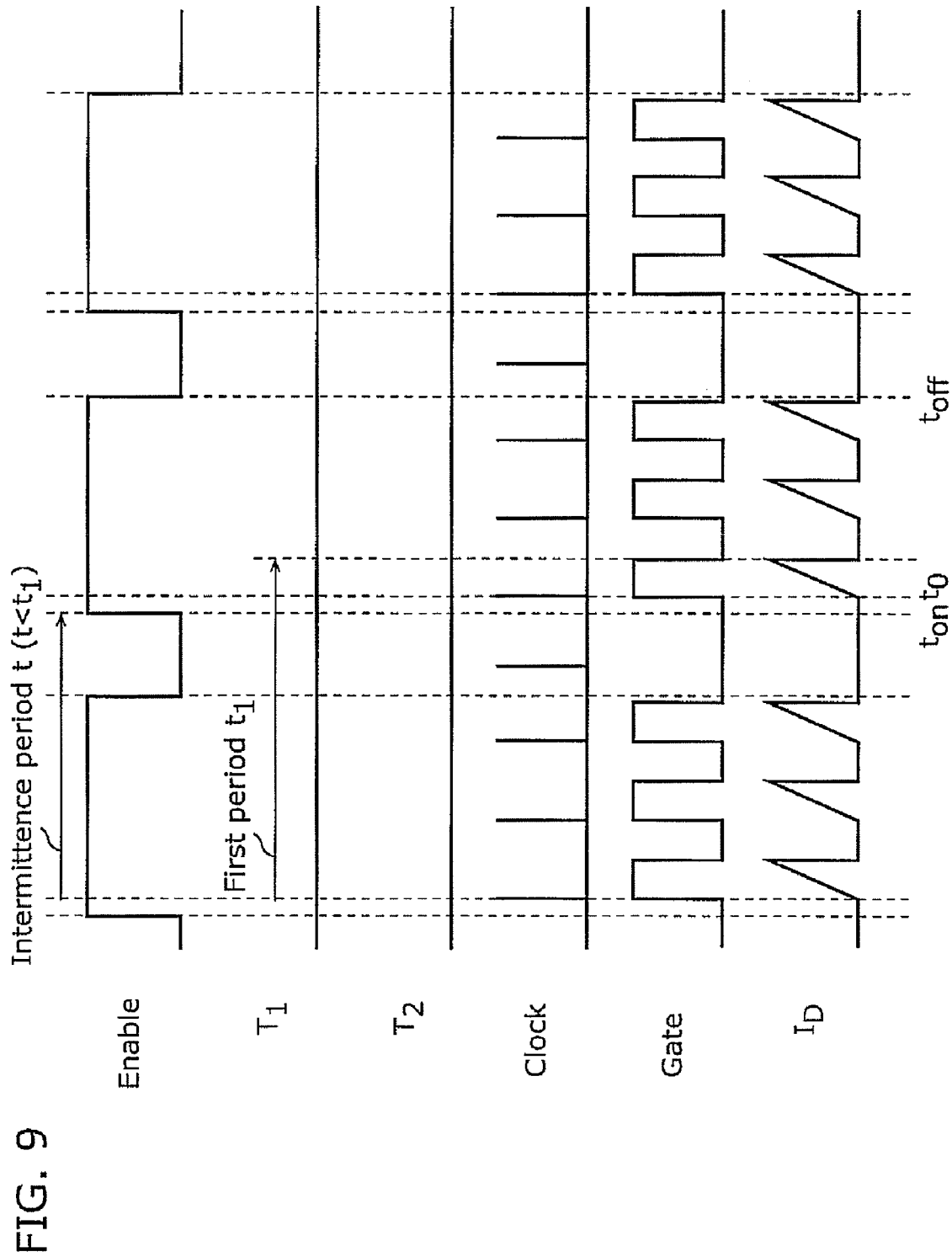
FIG. 9 is a timing chart which shows exemplary operation of the switching power supply apparatus including the semiconductor device according to Embodiment 1.
Figure 10:
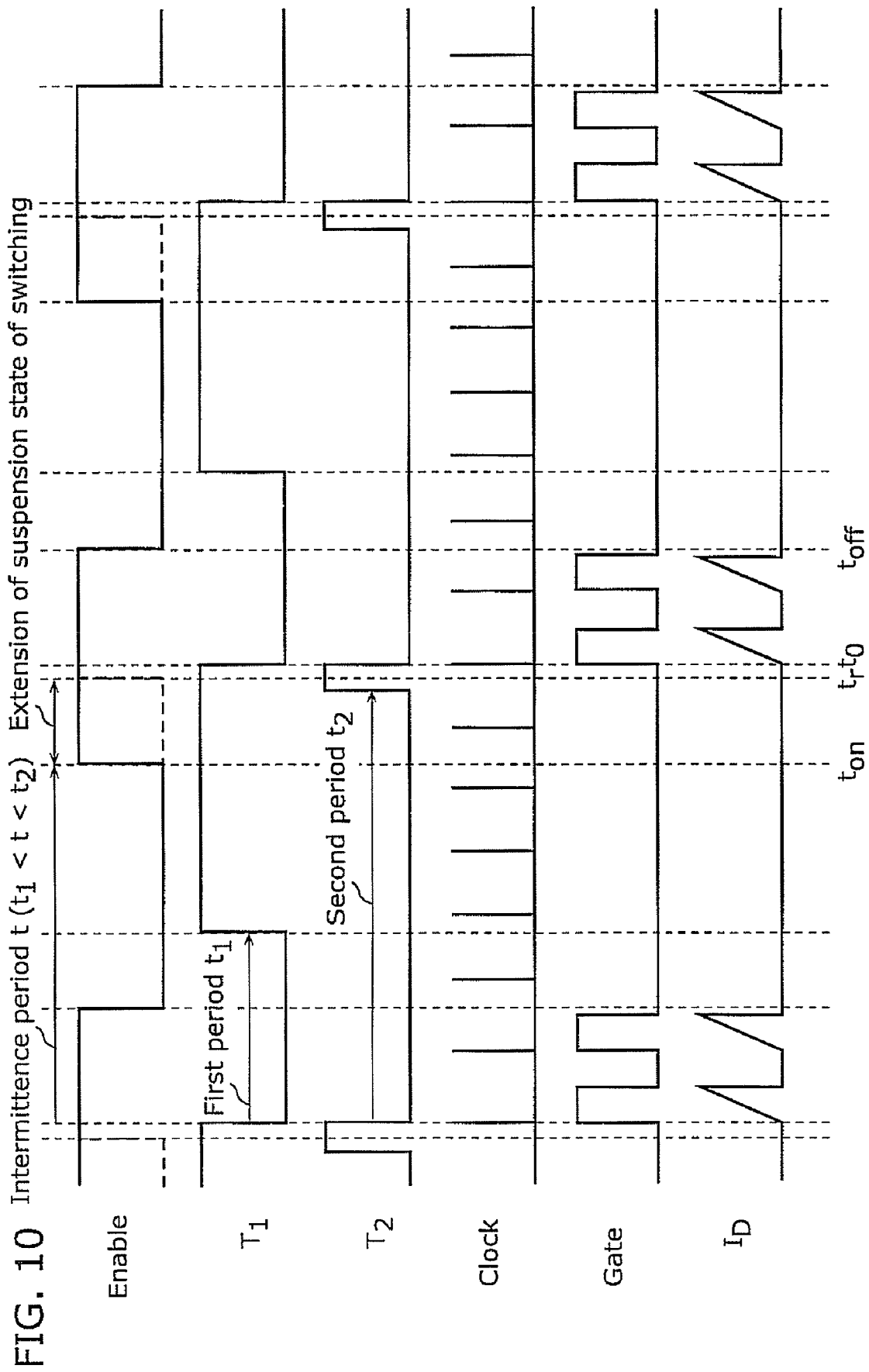
FIG. 10 is a timing chart which shows exemplary operation of the switching power supply apparatus including the semiconductor device according to Embodiment 1.
Figure 11:
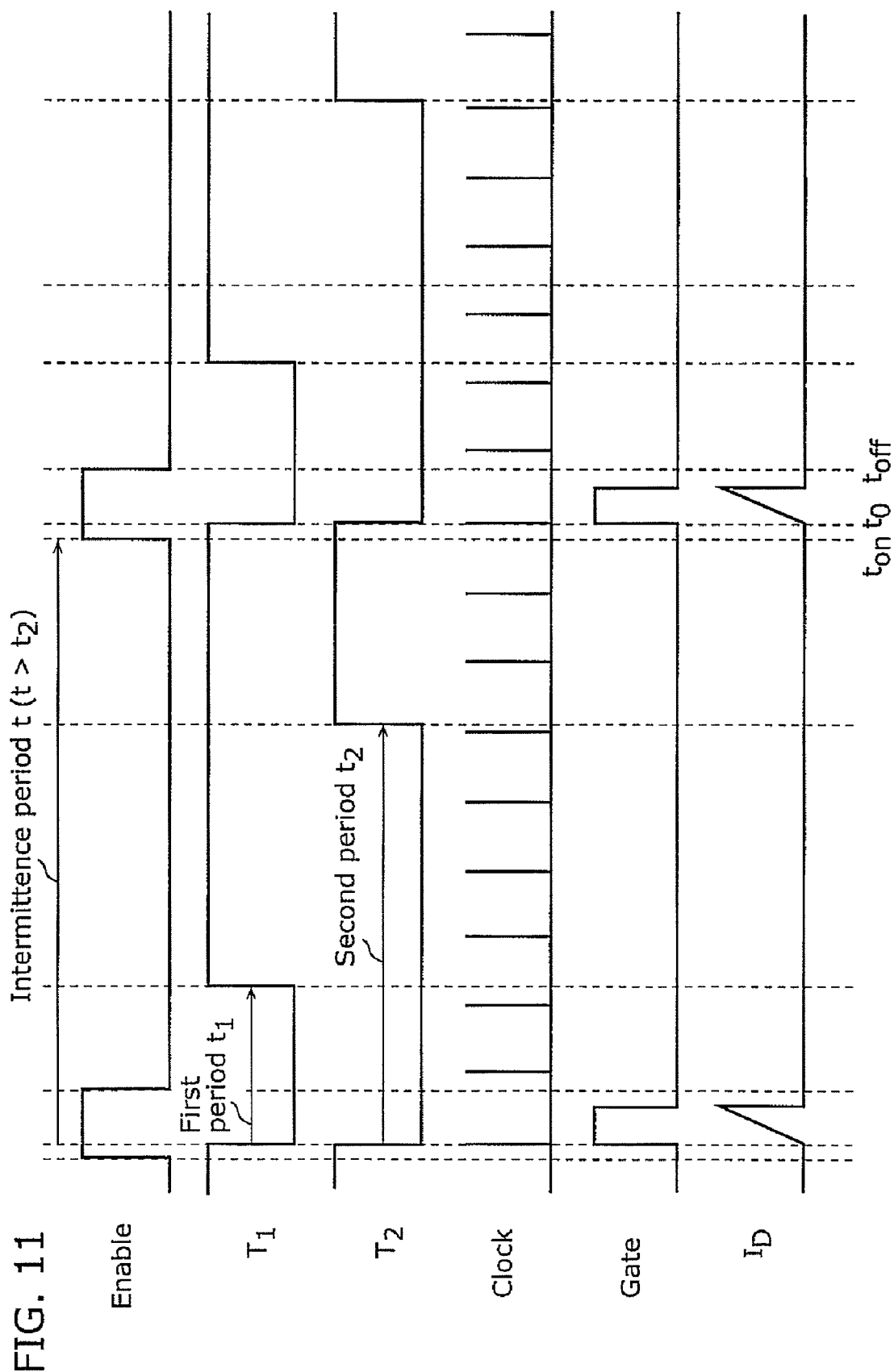
FIG. 11 is a timing chart which shows exemplary operation of the switching power supply apparatus including the semiconductor device according to Embodiment 1.

The following is a description of operation of the intermittent-oscillation frequency control circuit 17 and the turn-on control circuit 18 on the basis of temporal relationships among the enable signal of the intermittent oscillation control circuit 16 and the output signals $T_1$ and $T_2$ respectively of the first timer 57 and the second timer 58 in the intermittent oscillation frequency control circuit 17 with reference to timing charts, FIG. 9, FIG. 10, and FIG. 11.

FIG. 9 is a timing chart which shows operation in the case where an intermittence period t, which is composed of the execution period and the suspension period of switching operation during intermittent oscillation, is shorter than the first period $t_1$. FIG. 9 illustrates the enable signal outputted by the intermittent-oscillation control circuit 16, the output signal $T_1$ of the first timer 57 in the intermittent-oscillation frequency control circuit 17, the output signal $T_2$ of the second timer 58, the clock signal outputted by the clock generating unit 69 in the turn-on control circuit 18, the Gate signal outputted by the gate driver 21, and the current $I_D$ flowing through the switching element 2.

When the load becomes higher than when the switching operation is in the suspension state, and the enable signal outputted by the intermittent-oscillation control circuit 16 transitions from low to high at a time $t_{on}$, a pulse signal is provided through the first pulse generating unit shown in FIG. 7 to a first one of inputs of the NAND circuit 53. At this time, the output signal $T_1$ of the first timer 57 remains low because of a relationship of the intermittence period t<the first period $t_1$, so that the output signal of the NAND circuit 46 shown in FIG. 7 is at a high level. The output of the NAND circuit 53 is thus low, and the reset signal outputted by the NAND circuit 55 is at a high level.

The reset signal resets both the output Q of the RS flip-flop 56 and the output Q of the RS flip-flop 72 of the turn-on control circuit 18 shown in FIG. 8 to low.

After the RS flip-flop 72 is reset, the clock signal generated by the clock generating unit 69 is outputted through the NOR circuit 73 as the turn-on signal. As a result, the switching element 2 starts the switching operation at a time $t_0$ shown in FIG. 9. The output Q of the RS flip-flop 56 is set to high with the first signal pulse of the clock signal after the resetting. The first timer 57 and the second timer 58 then start measuring of the first period $t_1$ and the second period $t_2$ again, respectively, when receiving the start signal at a high level.

When the enable signal outputted by the intermittent-oscillation control circuit 16 transitions to low at a time $t_{off}$, the output Q of the RS flip-flop 72 shown in FIG. 8 is then set to high. As a result, the clock signal of the clock generating unit 69 is masked by the NOR circuit 73, and the switching operation of the switching element 2 is thereby stopped. This operation is subsequently repeated.

FIG. 10 is a timing chart which shows operation in the case where the intermittence period t during intermittent oscillation is longer than the first period $t_1$ and shorter than the second period $t_2$.

The signals and basic operation are the same as in the case described above; thus differences will be briefly described below.

When the enable signal transitions to high at the time $t_{on}$, the signal $T_n$ is high and the $T_2$ is low because of a relationship of the first period $t_1$<the intermittence period t<the second period $t_2$. The output signal of the NAND circuit 46 in FIG. 7 is at a low level, so that the output signal of the NAND circuit 53 is at a high level. In addition, both of the input signals of the NAND circuit 51 are at a high level, so that the NAND circuit 51 provides a high-level signal through the inverter circuit 52 to a first one of inputs of the NAND circuit 54. A signal provided to a second one of the inputs of the NAND circuit 54 remains at a low level, so that both of the input signals of the NAND circuit 55 are at a high level. The reset signal thus remains at a low level.

When the second period $t_2$ has elapsed, the output signal $T_2$ outputted from the second timer 58 transitions from low to high, and, in FIG. 7, the NAND circuit 54 receives a pulse signal through the inverter circuit 45 and the second pulse generating unit. The NAND circuit 54 outputs a pulse signal at a low level and the NAND circuit 55 outputs the reset signal at a high level.

The output Q of the RS flip-flop 72 in FIG. 8 is reset to low by the reset signal which derives from the output signal $T_2$ from the second timer 58. This causes the switching element 2 to start the switching operation.

It is actually soon after the end of the second period $t_2$ that the reset signal is outputted and the start signal to be inputted to the first timer 57 and the second timer 58 are reset to low. But it is assumed that the delay time of the signal is illustrated and the resetting is done at time $t_r$ for reasons of clarification.

This is how the change to the execution state of the switching operation is delayed until the end of the second period $t_2$ as shown using a dashed line along the enable signal in FIG. 10. The dashed line corresponds to a negation output ¬Q of the RS flip-flop 72.

When the enable signal of the intermittent-oscillation control circuit 16 transitions to low at a time $t_{off}$, the output Q of the RS flip-flop 72 shown in FIG. 8 is set to high. As a result, the clock signal of the clock generating unit 69 is masked by the NOR circuit 73, and the switching operation of the switching element 2 is thereby stopped. This operation is subsequently repeated.

FIG. 11 is a timing chart which shows operation in the case where the intermittence period t during intermittent oscillation is longer than the second period $t_2$.

When the enable signal transitions to high at the time $t_{on}$, both the output signal $T_1$ of the first timer 57 and the output signal $T_2$ of the second timer 58 are high. The output signal of the NAND circuit 53 then transitions to low, so that the NAND circuit 55 outputs the reset signal. A subsequent part of the operation is continued in the same manner as shown in FIG. 9 and FIG. 10; thus a description thereof is omitted.

Figure 12A:
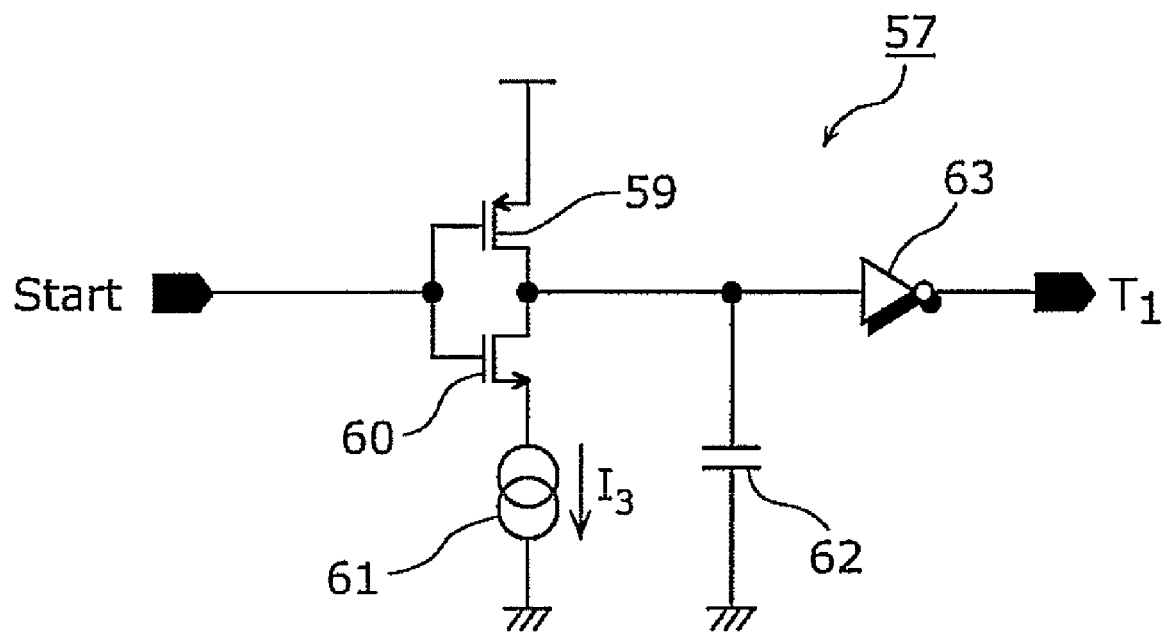
FIG. 12A is a circuit diagram which shows an exemplary configuration of a first timer included in the intermittent-oscillation frequency control circuit of the semiconductor device according to Embodiment 1.
Figure 12B:
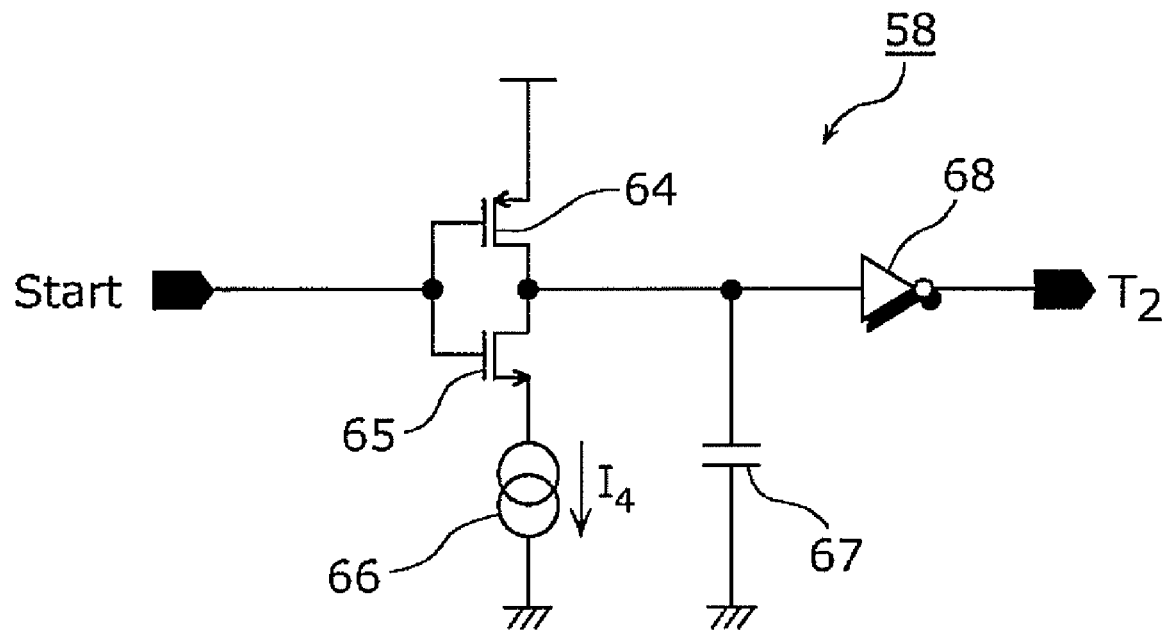
FIG. 12B is a circuit diagram which shows an exemplary configuration of a second timer included in the intermittent-oscillation frequency control circuit of the semiconductor device according to Embodiment 1.

FIG. 12A and FIG. 12B show an exemplary configuration of the first timer 57 and the second timer 58 included in the intermittent-oscillation frequency control circuit 17.

The following describes only a configuration and operation of the first timer 57 because the first timer 57 and the second timer 58 share their configuration and operation.

The first timer 57 includes a p-type MOSFET 59, an n-type MOSFET 60, a constant current source 61, a capacitor 62, and an inverter circuit 63.

When the start signal is low in the first timer 57 with this configuration, the p-type MOSFET 59 is on and a voltage at a terminal other than a GND terminal of the capacitor 62 is the source voltage VCC.

When the start signal transitions to high, then the p-type MOSFET 59 turns off and the n-type MOSFET 60 turns on. At this time, the constant current source 61 extracts electric charges stored in the capacitor 62 at a constant rate. When the voltage of the capacitor 62 then deceases and reaches a threshold voltage of the inverter circuit 63, then the p-type MOSFET in the inverter circuit 63 turns on and the output signal $T_1$ transitions from low to high.

For the first timer 57, the first period $t_1$ which is a time from when the start signal transitions to high to when the output signal $T_1$ transitions to low, is determined by EQ. 4.

$$t_1 = (C \times V_{th})/I_3 \quad \text{(EQ. 4)},$$

where

C: Capacity of the capacitor 62, $V_{th}$: Threshold voltage of the inverter circuit 63, and $I_3$: Current flowing through the constant current source 61.

The second timer 58 is configured in the same manner as the first timer 57 is, using a p-type MOSFET 64, an n-type MOSFET 65, a constant current source 66, a capacitor 67, and an inverter circuit 68.

For the second timer 58, the second period $t_2$ which is a time from when the start signal transitions high to when the output signal $T_2$ transitions to low, is determined using a capacity C of the capacitor 67, a threshold voltage $V_{th}$ of the inverter circuit 68, and an current $I_4$ flowing through the constant current source 66 instead of the terms in EQ. 4 correspondingly.

In Embodiment 1, measurement of the first period $t_1$ and the second period $t_2$, which is longer than the first period, is thus started when the first clock signal is outputted after the enable signal transitions to high instructing to execute the switching operation.

In the case where the intermittence period t, which is a period in which the enable signal once transitions to low instructing to suspend the switching operation and at the end of which the enable signal transitions to high again, is shorter than the first period $t_1$, the switching operation of the switching element 2 is immediately started according to the enable signal.

In the case where the intermittence period t falls within a time range from the first period $t_1$ to the second period $t_2$, the suspension state of the switching operation is extended until when the second period $t_2$ has elapsed, and then the switching is changed from the suspension state to the execution state after the second period $t_2$ has elapsed.

In the case where the intermittence period t is longer than the second period $t_2$, the switching operation of the switching element 2 is immediately started according to the enable signal.

The intermittence period t thus necessarily falls outside of the time range from the first period $t_1$ to the second period $t_2$, so that the intermittent control frequency is prevented from falling within a specific frequency band. Such control reduces audio noises generated by the transformer or the capacitor during intermittent oscillation of the specific frequency band.

For example, intermittent oscillation is not performed in a frequency band from 5 kHz to 20 kHz when the first period $t_1$ is 50 µs and the second period $t_2$ is 200 µs.

(Embodiment 2)

A switching power supply apparatus according to Embodiment 2 of the present invention will be described below. The switching power supply apparatus according to Embodiment 2 has a change from the switching power supply apparatus according to Embodiment 1 that the switching power supply apparatus according to Embodiment 2 extends the execution state of the switching operation so that an intermittence period falls outside of a specific time range.

This change is achieved by, for example, using the enable signal described in the Embodiment 1 as an active-low signal. Specifically, an active-low enable signal (hereinafter expressed as a ¬ enable signal) in the switching power supply apparatus according to Embodiment 2 instructs to suspend switching operation at a high level and instructs to execute switching operation at a low level.

Specific changes for causing the switching power supply apparatus to operate according to the ¬ enable signal includes insertion of an inverter circuit immediately before the output on the intermittent-oscillation control circuit 16 shown in FIG. 6, and change of the input into the NOR circuit 73 shown in FIG. 8 from the output Q to the negation output ¬Q of the RS flip-flop 72.

Figure 13:
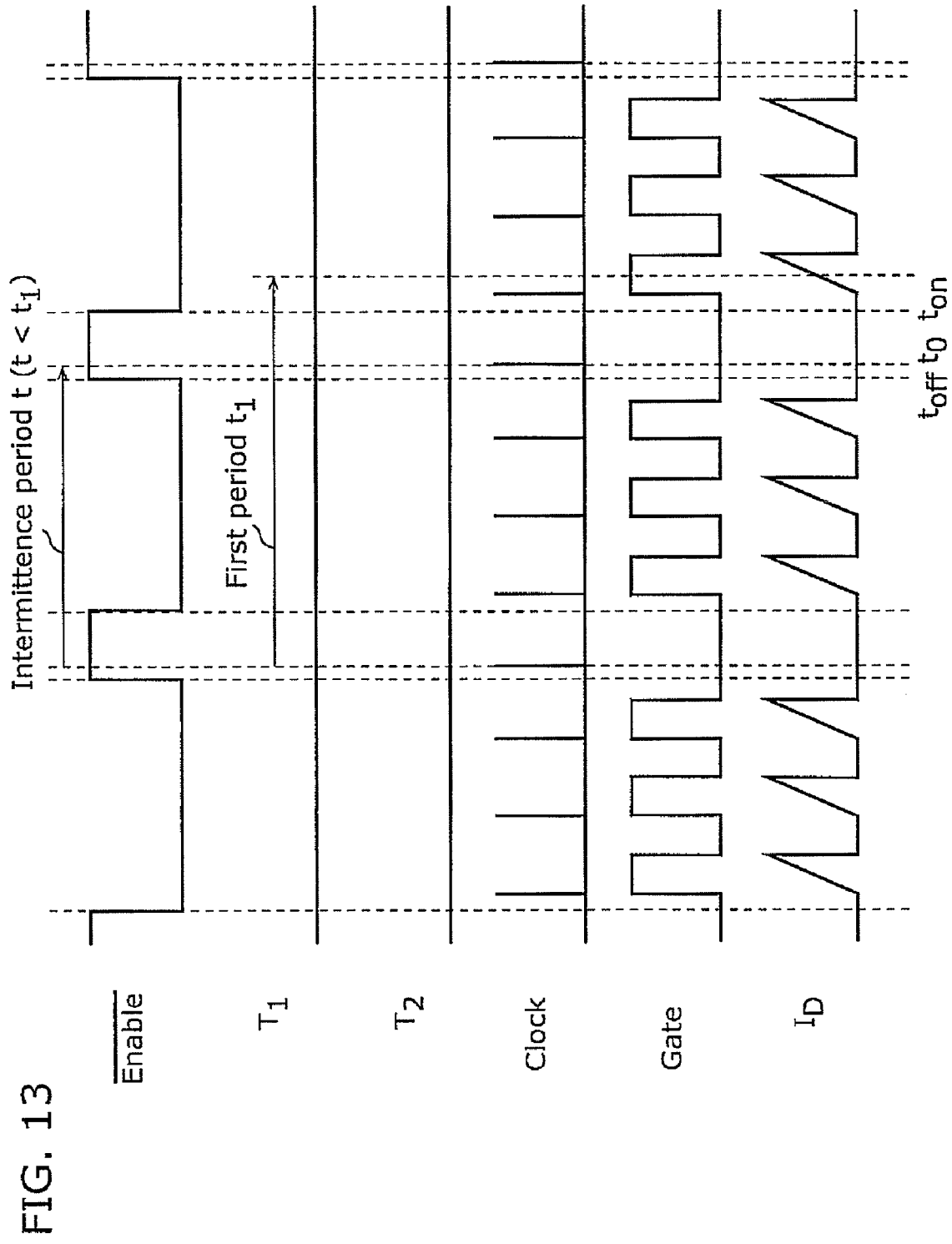
FIG. 13 is a timing chart which shows exemplary operation of a switching power supply apparatus including a semiconductor device according to Embodiment 2.
Figure 14:
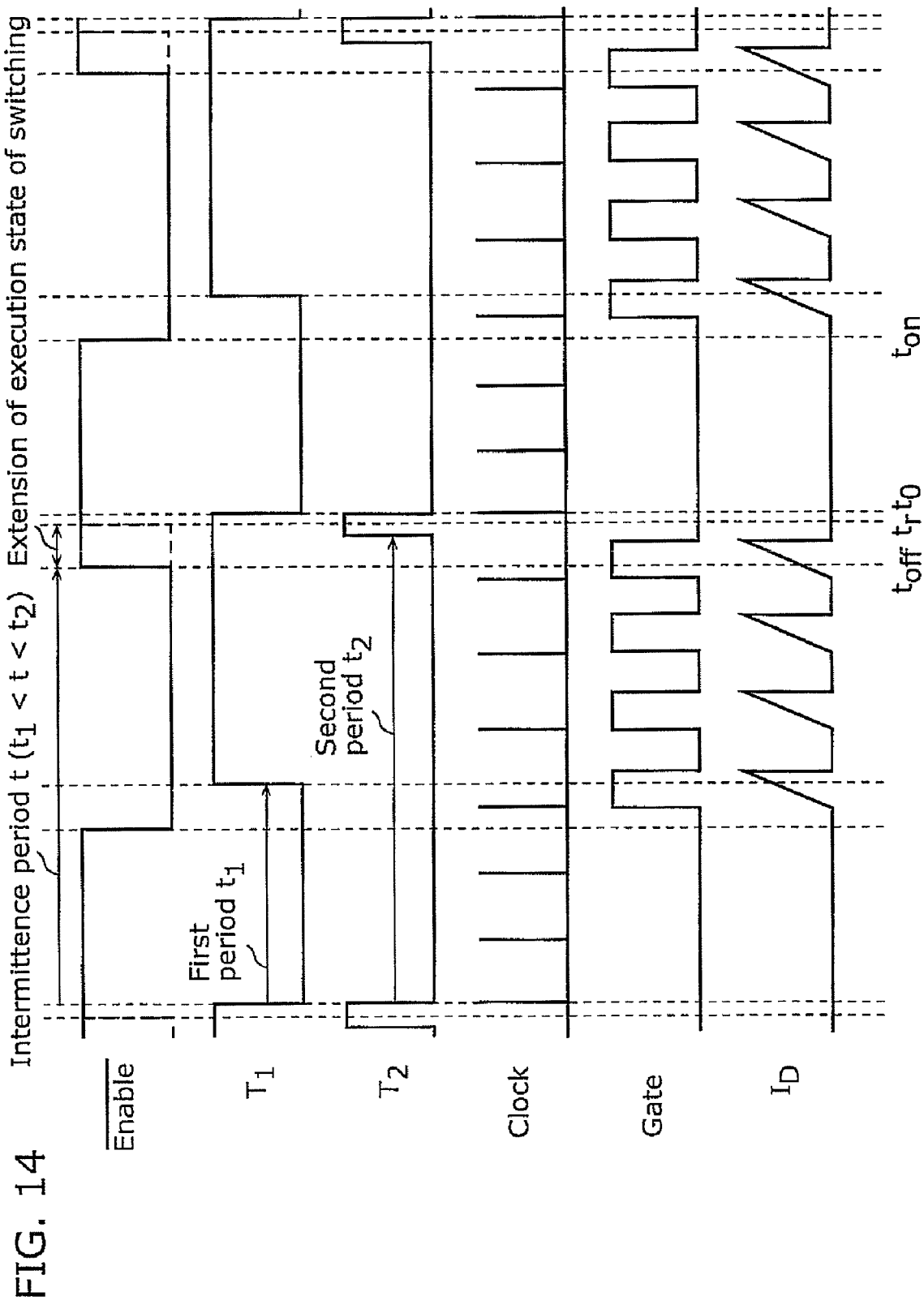
FIG. 14 is a timing chart which shows exemplary operation of the switching power supply apparatus including the semiconductor device according to Embodiment 2.
Figure 15:
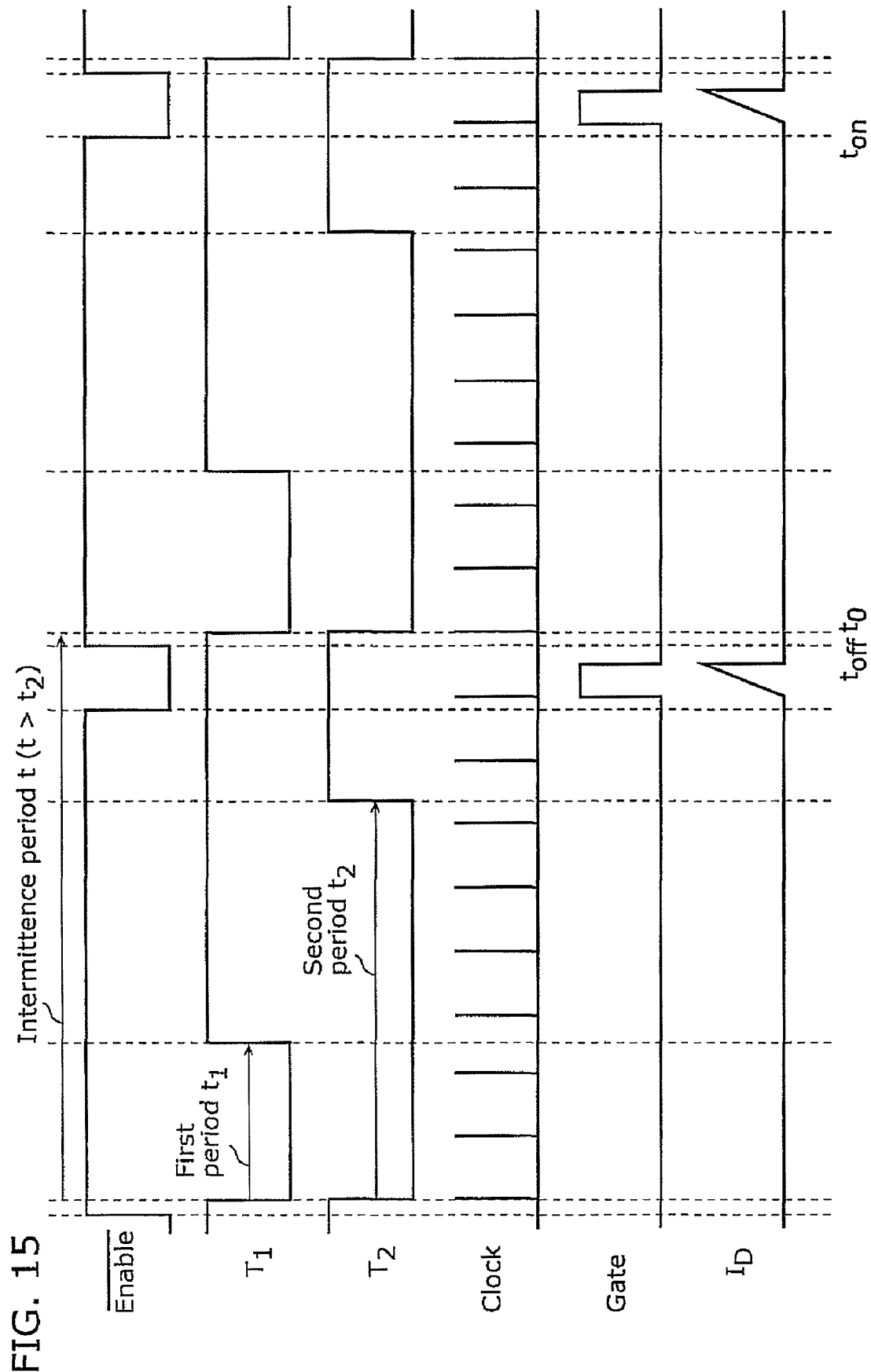
FIG. 15 is a timing chart which shows exemplary operation of the switching power supply apparatus including the semiconductor device according to Embodiment 2.

FIG. 13, FIG. 14, and FIG. 15 are timing charts which show operation of the switching power supply apparatus according to Embodiment 2. In FIG. 13, FIG. 14, and FIG. 15, the ¬ enable signal is indicated by adding an overline to its signal name.

The following description primarily describes differences in operation resulting from use of the active-low enable signal because basic idea of the operation is the same as that of Embodiment 1.

The timing chart shown in FIG. 13 operation in the case where an intermittence period t, which is composed of an execution period and a suspension period of switching operation during intermittent oscillation, is shorter than the first period $t_1$.

The ¬ enable signal transitions from low to high at a time $t_{off}$. At this time, the switching operation immediately changes to the suspension state because of a relationship of the intermittence period t<the first period $t_1$. Subsequently, the first timer 57 and the second timer 58 start measuring of the first period $t_1$ and the second period $t_2$ again, respectively, at a time $t_0$ at which the clock generating unit 69 in the turn-on control circuit 18 outputs the clock signal. Subsequently, the ¬ enable signal outputted by the intermittent-oscillation control circuit 16 transitions from high to low at the time $t_{on}$, changing the switching operation to the execution state. This operation is subsequently repeated.

FIG. 14 is a timing chart which shows operation in the case where the intermittence period t in intermittent oscillation is longer than the first period $t_1$ and shorter than the second period $t_2$.

When the ¬ enable signal transitions to high at the time $t_{on}$, the output signal $T_2$ of the second timer 58 is low because of a relationship of the first period $t_1$<the intermittence period t<the second period $t_2$. The switching element 2 thus continues switching operation without changing to the suspension state of the switching operation.

When the second period $t_2$ has elapsed and the output signal $T_2$ of the second timer 58 transitions to high, time measurement of the first timer 57 and the second timer 58 is reset and the reset signal of the intermittent-oscillation frequency control circuit 17 is inputted into the turn-on control circuit 18, so that the turn-on control circuit 18 changes to the suspension state of the switching operation. Subsequently, the first timer 57 and the second timer 58 start measuring of the first period $t_1$ and the second period $t_n$ again, respectively, at the time $t_0$ upon receiving the clock signal from the clock generating unit 69 of the turn-on control circuit 18.

In other words, in the case where the intermittence period t is longer than the first period $t_1$ and shorter than the second period $t_2$, the turn-on control circuit 18 does not change to the suspension state of the switching operation upon an instruction to suspend the switching operation provided by the ¬ enable signal, but the switching operation is continued through the control above until the output signal $T_2$ of the second timer 58 transitions to high.

This is how the change to the suspension state of the switching operation is delayed until the end of the second period $t_2$ as shown using the dashed line along the ¬ enable signal in FIG. 14. The dashed line corresponds to the negation output ¬Q of the RS flip-flop 72 shown in FIG. 8. This operation is subsequently repeated.

FIG. 15 is a timing chart which shows operation in the case where the intermittence period t is longer than the second period $t_2$.

The ¬ enable signal transitions from low to high at the time $t_{off}$. At this time, the switching operation immediately changes to the suspension state because of a relationship of the intermittence period t>the second period $t_2$. Subsequently, the first timer 57 and the second timer 58 start measuring of the first period $t_1$ and the second period $t_2$ again, respectively, at a time $t_0$ at which the clock generating unit 69 in the turn-on control circuit 18 outputs the clock signal. The ¬ enable signal the switching operation transitions from high to low at a time $t_{on}$, changing the switching operation to the execution state. This operation is subsequently repeated.

Thus, as with Embodiment 1, the intermittence period t necessarily falls outside of the range from the first period $t_1$ to the second period $t_2$, so that the intermittent control frequency is prevented from falling within a specific frequency band. Such control reduces audio noises generated by the transformer or the capacitor during intermittent oscillation of the specific frequency band.

(Embodiment 3)

A switching power supply apparatus according to Embodiment 3 of the present invention will be described below.

Figure 16:
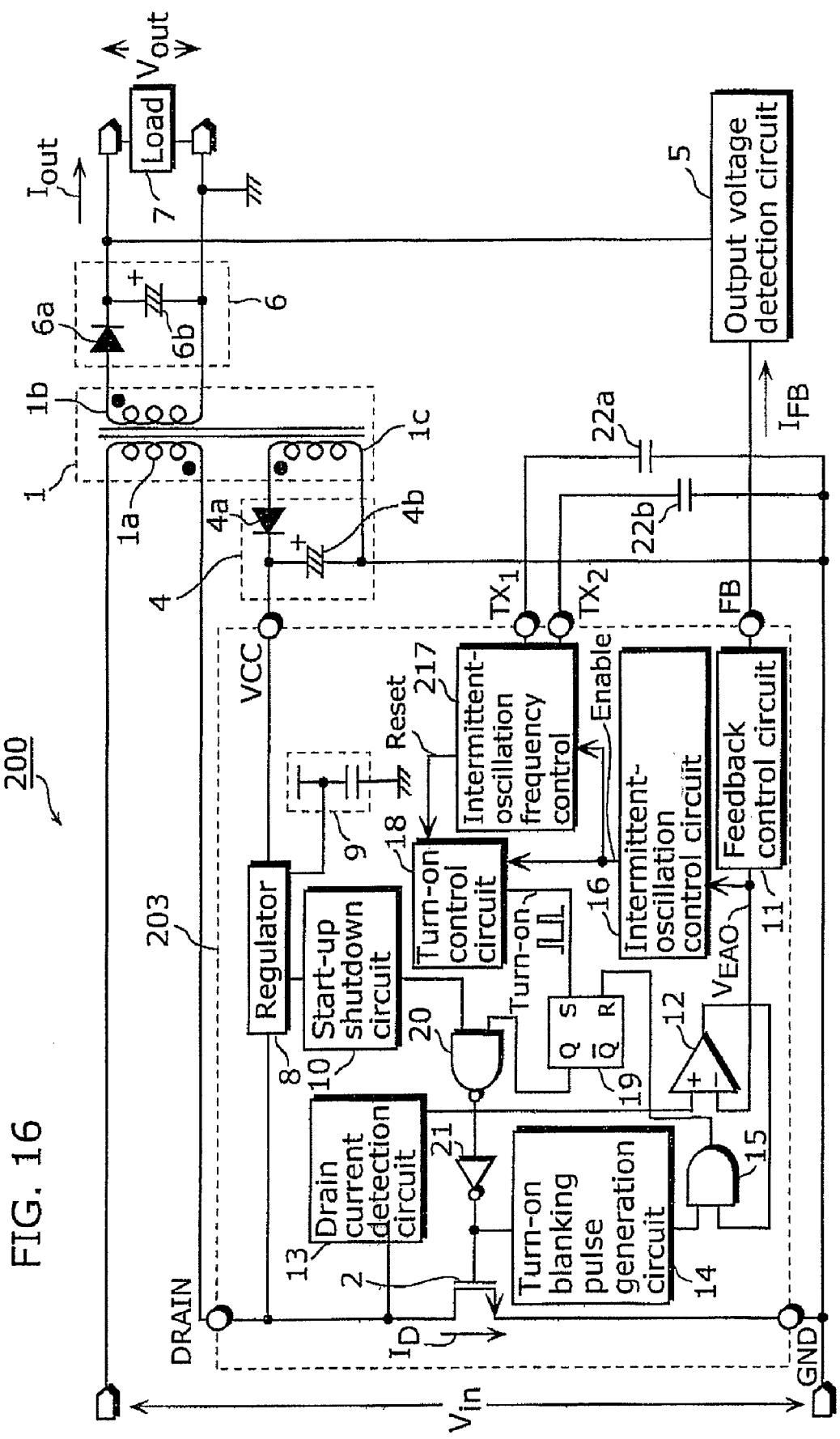
FIG. 16 is a circuit diagram which shows an exemplary configuration of a switching power supply apparatus including a semiconductor device according to Embodiment 3.

FIG. 16 is a circuit diagram which shows an exemplary configuration of a switching power supply apparatus 200 including a semiconductor device according to Embodiment 3. The semiconductor device functions as a control circuit 203 of the switching power supply apparatus 200.

The semiconductor device which functions as the control circuit 203 has a $TX_1$ terminal and a $TX_2$ terminal for setting desired periods to be measured by a first timer 257 and a second timer 258 included in the intermittent-oscillation frequency control circuit 217. The $TX_1$ terminal and the $TX_2$ terminal can be connected to external capacitors 22a and 22b, respectively, each of which is a set-time reconfiguration unit. The rest of the components are configured in the same manner as the switching power supply apparatus 100 shown in FIG. 3.

Figure 17A:
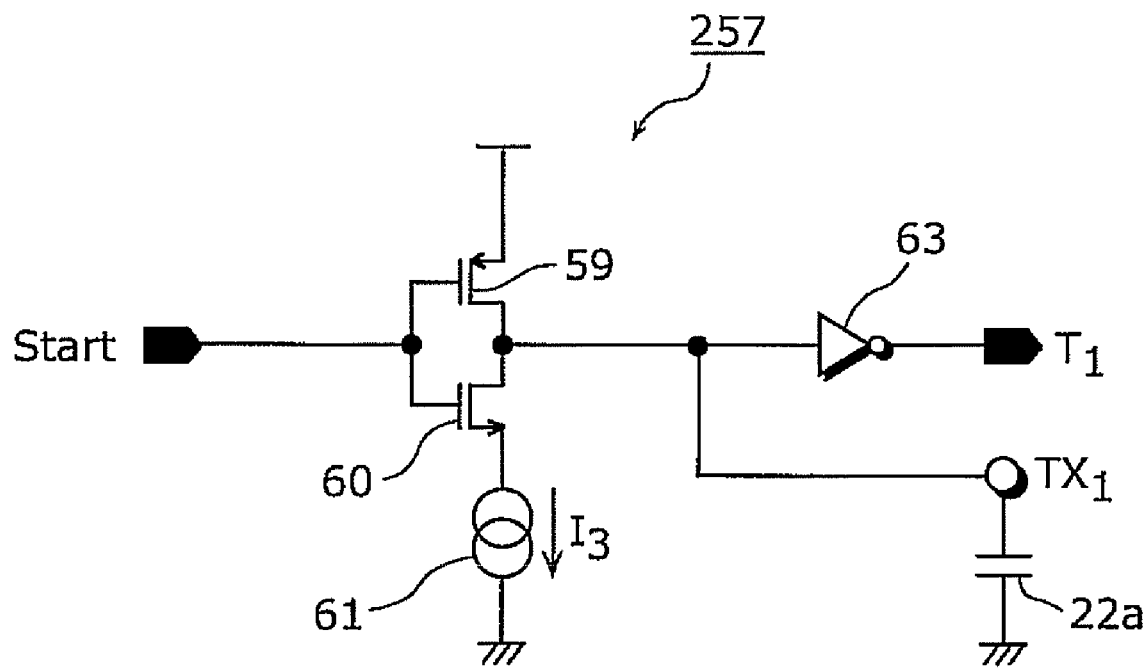
FIG. 17A is a circuit diagram which shows an exemplary configuration of a first timer included in an intermittent-oscillation frequency control circuit of the semiconductor device according to Embodiment 3.
Figure 17B:
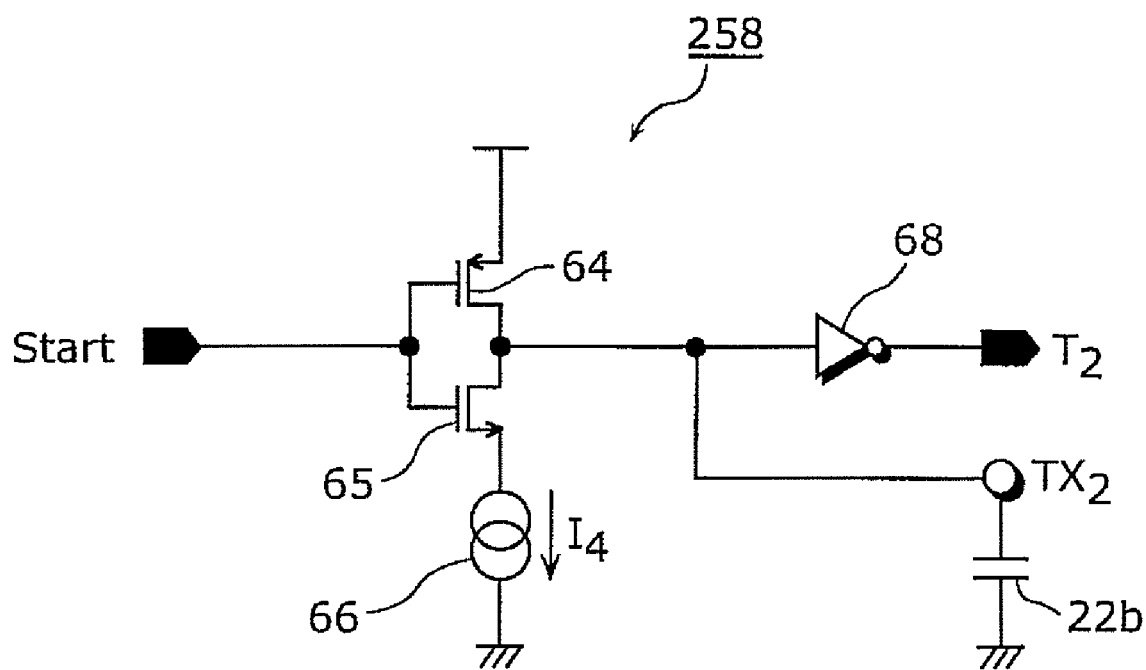
FIG. 17B is a circuit diagram which shows an exemplary configuration of a second timer included in an intermittent-oscillation frequency control circuit of the semiconductor device according to Embodiment 3.

FIG. 17A and FIG. 17B show exemplary circuits of the first timer 257 and the second timer 258 included in the intermittent-oscillation frequency control circuit 217 of the control circuit 203 having the $TX_1$ terminal and the $TX_2$ terminal.

The capacitor 22a, which is one of the external capacitors, is connected to the first timer 257 instead of the capacitor 62 of the first timer 57 shown in FIG. 12A. The capacitor 22b, which is the other of the external capacitors, is connected to the second timer 258 instead of the capacitor 67 of the second timer 58 shown in FIG. 12B.

It is also possible that only one of a first period $t_1$ and a second period $t_2$, which are measured by the first timer 257 and the second timer 258, respectively, is set as desired using one of the $TX_1$ terminal and the $TX_2$ terminal, only one of which is provided, or that two TX terminals are provided so that both of the first period $t_1$ and the second period $t_2$, which are measured by the first timer 257 and the second timer 258, respectively, are set as desired.

Setting at least one of the first period $t_1$ and the second period $t_2$ as desired allows configuration of the sum of the first period $t_1$ and the second period $t_2$ in accordance with a frequency band which causes a transformer or a ceramic capacitor to generate audio noises during intermittent oscillation, thus producing an advantageous effect of reducing, by using semiconductor devices which has the same configuration as that of the control circuit 203, audio noises of switching power supply apparatuses which have various specifications and generate audio noises at different frequency bands.

Furthermore, this configuration allows narrowing the frequency band within which intermittent oscillation is suspended during intermittent oscillation in accordance with a frequency band within which components such as a transformer generate audio noises, thus reducing ripples in output during the intermittent oscillation.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Industrial Applicability

The switching power supply apparatus and the semiconductor device according to the present invention are applicable to use as or in a switching power supply apparatus such as an AC-AC converter or a DC-DC converter.

What is claimed is:

1. A semiconductor device which controls a switching power supply that converts an input direct current voltage to a regulated output direct current voltage by intermittently switching on and off the input direct current voltage using a switching element, said semiconductor device comprising:

an intermittent-oscillation control circuit which outputs an enable signal providing an instruction to execute the switching and an instruction to suspend the switching alternately;
a turn-on control circuit which changes between an execution state and a suspension state of the switching according to the instructions of the enable signal, and outputs a turn-on signal which turns on the switching element with a switching period; and
an intermittent-oscillation frequency control circuit which causes said turn-on control circuit to delay the changing between the execution state and the suspension state of the switching so that an intermittence period falls outside of a specific time range, the intermittence period including a period during which said turn-on control circuit is in the execution state and a period during which said turn-on control circuit is in the suspension state,
wherein said intermittent-oscillation frequency control circuit includes:
a first timer which measures a first period from a time point when said turn-on control circuit is in one of the execution state and the suspension state of the switching; and
a second timer which measures a second period from the time point, the second period being longer than the first period, and,
said intermittent-oscillation frequency control circuit delays the changing of said turn-on control circuit to the one of the execution state and the suspension state of the switching until an end of the second period in the case where the enable signal provides one of the instruction to execute the switching and the instruction to suspend the switching after an end of the first period and before the end of the second period.

2. The semiconductor device according to claim 1, wherein said turn-on control circuit generates a clock signal having a frequency of the switching and outputs the clock signal as the turn-on signal only while in the execution state of the switching,
said intermittent-oscillation frequency control circuit,
in the case where said first timer and said second timer has measured the first period and the second period, respectively, since the time point when said turn-on control circuit is in one of the execution state and the suspension state of the switching,
outputs a reset signal as soon as the enable signal provides the one of the instruction to execute the switching and the instruction to suspend the switching before the end of the first period or after the end of the second period, and
outputs a reset signal after the end of the second period when the enable signal provides the one of the instruction to execute the switching and the instruction to suspend the switching after the end of the first period and before the end of the second period,
said turn-on control circuit changes to the one of the execution state and the suspension state of the switching in accordance with the reset signal, and said first timer and said second timer start measuring the first period and the second period again, respectively, in a cycle of the clock signal, the cycle coming first after the output of the reset signal.

3. The semiconductor device according to claim 2, wherein said turn-on control circuit includes:
a latch circuit which outputs a state signal that indicates whether said turn-on control circuit is in the execution state or the suspension state of the switching when said latch circuit is set or reset, the setting being performed when the enable signal provides the other one of the instruction to execute the switching and the instruction to suspend the switching, and the resetting being performed when the latch circuit is provided with the reset signal; and
a logic gate which outputs the clock signal as the turn-on signal when the state signal indicates that said turn-on control circuit is in the execution state of the switching, and which masks the clock signal when the state signal indicates that said turn-on control circuit is in the suspension state of the switching.

4. The semiconductor device according to claim 1, wherein said first timer has a first constant current source and a first capacitor and sets the first period to be measured depending on a current of the first constant current source and a capacitance of the first capacitor, and said second timer has a second constant current source and a second capacitor and sets the second period to be measured depending on a current of the second constant current source and a capacitance of the second capacitor.

5. The semiconductor device according to claim 1, wherein said semiconductor device is provided with at least one of a first external terminal and a second external terminal, said first external terminal being used for setting the first period to be measured by said first timer, and said second period being used for setting the second period to be measured by said second timer.

6. The semiconductor device according to claim 5, wherein a first capacitor is connected between said first external terminal and a ground, and a second capacitor is connected between said second external terminal and the ground, said first capacitor being used for setting the first period, and said second capacitor being used for setting the second period.

7. The semiconductor device according to claim 1, wherein said semiconductor device includes the switching element, and whole circuitry including the switching element is formed on a single semiconductor substrate.

8. The switching power supply apparatus comprising:
the semiconductor device according to claim 1;
a transformer which transforms, into an output alternating current voltage, an input alternating current voltage generated by switching on and off the input direct current voltage using the switching element; and
a smoothing circuit which converts the output alternating current voltage into the output direct current voltage.

* * * * *